(12) United States Patent
Champion

(10) Patent No.: US 8,301,800 B1
(45) Date of Patent: Oct. 30, 2012

(54) MESSAGE PROCESSING FOR DISTRIBUTED COMPUTING ENVIRONMENTS

(75) Inventor: Kerry Champion, Menlo Park, CA (US)

(73) Assignee: Actional Corporation, Bedford, MA (US)

( * ) Notice: Subject to any disclaimer, the term of this patent is extended or adjusted under 35 U.S.C. 154(b) by 1906 days.

(21) Appl. No.: 10/612,399

(22) Filed: Jul. 1, 2003

Related U.S. Application Data

(60) Provisional application No. 60/394,109, filed on Jul. 2, 2002.

(51) Int. Cl.
*G06F 15/173* (2006.01)

(52) U.S. Cl. ........ 709/238; 709/203; 709/223; 709/227; 719/313

(58) Field of Classification Search .................. 709/201, 709/203, 238, 227, 223, 229; 719/313, 330
See application file for complete search history.

(56) References Cited

U.S. PATENT DOCUMENTS

| | | |
|---|---|---|
| 5,245,616 A | 9/1993 | Olson |
| 5,392,398 A | 2/1995 | Meyer |
| 5,596,720 A | 1/1997 | Hamada et al. |
| 5,758,354 A | 5/1998 | Huang et al. |
| 5,765,033 A | 6/1998 | Miloslavsky |
| 5,805,825 A | 9/1998 | Danneels et al. |
| 5,822,526 A | 10/1998 | Waskiewicz |
| 5,850,525 A | 12/1998 | Kalkunte et al. |
| 5,857,201 A | 1/1999 | Wright, Jr. et al. |
| 5,870,605 A | 2/1999 | Bracho et al. |
| 5,878,056 A | 3/1999 | Black et al. |
| 5,951,648 A | 9/1999 | Kailash |
| 6,016,515 A | 1/2000 | Shaw et al. |
| 6,061,559 A | 5/2000 | Eriksson et al. |
| 6,112,323 A | 8/2000 | Meizlik et al. |
| 6,128,646 A | 10/2000 | Miloslavsky |
| 6,145,781 A | 11/2000 | Kawabe et al. |
| 6,167,445 A | 12/2000 | Gai et al. |
| 6,289,212 B1 | 9/2001 | Stein et al. |
| 6,298,455 B1 | 10/2001 | Knapman et al. |
| 6,336,119 B1 | 1/2002 | Banavar et al. |
| 6,397,352 B1 | 5/2002 | Chandrasekaran et al. |
| 6,452,934 B1 | 9/2002 | Nakata |
| 6,453,346 B1 | 9/2002 | Garg et al. |
| 6,484,198 B1 | 11/2002 | Milovanovic et al. |
| 6,513,154 B1 | 1/2003 | Porterfield |
| 6,643,682 B1 | 11/2003 | Todd et al. |
| 6,647,544 B1 | 11/2003 | Ryman et al. |

(Continued)

OTHER PUBLICATIONS

Christensen, Erik, et al., *Web Services Description Language (WSDL)* 1.1, World Wide Web Consortium, W3C Note Mar. 15, 2001, <http://www.w3.org/TR/wsdl>, pp. 1-40, downloaded Jul. 11, 2003.

(Continued)

*Primary Examiner* — Ramy M Osman

(74) *Attorney, Agent, or Firm* — Wilmer Cutler Pickering Hale & Dorr LLP

(57) ABSTRACT

Techniques for representation of data representations associated with message processing are disclosed. The techniques can be used to implement a message server operating in a distributed computing environment. The message server provides a flexible environment which is better suited for creation and maintenance of message processing representations used to exchange messages between various nodes in the distributed computing environment. In addition, the message server is also capable of generating pre-computed data suitable for runtime processing of messages. The pre-computed data can be used to improve runtime processing of messages. As result, many problems associated with message processing in conventional distributed computing environments can be addressed.

24 Claims, 18 Drawing Sheets

U.S. PATENT DOCUMENTS

| | | | |
|---|---|---|---|
| 6,728,715 B1 | 4/2004 | Astley et al. | |
| 6,732,175 B1* | 5/2004 | Abjanic | 709/203 |
| 6,782,386 B1 | 8/2004 | Gebauer | |
| 6,792,460 B2 | 9/2004 | Oulu et al. | |
| 6,801,604 B2 | 10/2004 | Maes et al. | |
| 6,807,636 B2 | 10/2004 | Hartman et al. | |
| 6,816,898 B1 | 11/2004 | Scarpelli et al. | |
| 6,898,556 B2 | 5/2005 | Smocha et al. | |
| 6,901,447 B2 | 5/2005 | Koo et al. | |
| 6,944,662 B2 | 9/2005 | Devine et al. | |
| 6,965,939 B2* | 11/2005 | Cuomo et al. | 709/229 |
| 6,983,479 B1 | 1/2006 | Salas et al. | |
| 7,007,278 B2* | 2/2006 | Gungabeesoon | 719/311 |
| 7,028,089 B2 | 4/2006 | Agarwalla et al. | |
| 7,039,701 B2 | 5/2006 | Wesley | |
| 7,096,263 B2 | 8/2006 | Leighton et al. | |
| 7,103,054 B2 | 9/2006 | Novaes | |
| 7,136,913 B2* | 11/2006 | Linderman | 709/223 |
| 7,177,929 B2 | 2/2007 | Burbeck et al. | |
| 7,251,689 B2 | 7/2007 | Wesley | |
| 7,287,097 B1 | 10/2007 | Friend et al. | |
| 7,302,492 B1* | 11/2007 | Day | 709/238 |
| 7,302,634 B2 | 11/2007 | Lucovsky et al. | |
| 7,334,022 B2 | 2/2008 | Nishimura et al. | |
| 7,359,919 B2 | 4/2008 | Cohen et al. | |
| 7,379,971 B2 | 5/2008 | Miller et al. | |
| 7,386,630 B2 | 6/2008 | Liong et al. | |
| 7,395,349 B1 | 7/2008 | Szabo et al. | |
| 7,406,440 B2 | 7/2008 | Napier et al. | |
| 7,406,537 B2 | 7/2008 | Cullen | |
| 7,418,501 B2 | 8/2008 | Davis et al. | |
| 7,433,835 B2 | 10/2008 | Frederick et al. | |
| 7,464,154 B2 | 12/2008 | Dick et al. | |
| 7,467,196 B2 | 12/2008 | Di Luoffo et al. | |
| 7,487,510 B1 | 2/2009 | Carr | |
| 7,496,637 B2 | 2/2009 | Han et al. | |
| 7,512,957 B2 | 3/2009 | Cohen et al. | |
| 7,516,191 B2 | 4/2009 | Brouk et al. | |
| 7,533,172 B2 | 5/2009 | Traversat et al. | |
| 7,539,656 B2 | 5/2009 | Fratkina et al. | |
| 7,543,280 B2* | 6/2009 | Rosenthal et al. | 719/313 |
| 7,603,358 B1 | 10/2009 | Anderson et al. | |
| 7,702,636 B1 | 4/2010 | Sholtis et al. | |
| 7,752,604 B2 | 7/2010 | Genkin et al. | |
| 7,801,946 B2 | 9/2010 | Bearman | |
| 7,801,976 B2 | 9/2010 | Hodges et al. | |
| 7,881,992 B1 | 2/2011 | Seaman et al. | |
| 7,887,511 B2 | 2/2011 | Mernoe et al. | |
| 7,895,262 B2 | 2/2011 | Nielsen et al. | |
| 7,941,542 B2 | 5/2011 | Broda et al. | |
| 8,001,232 B1 | 8/2011 | Saulpaugh et al. | |
| 8,060,553 B2 | 11/2011 | Mamou et al. | |
| 2001/0007993 A1 | 7/2001 | Wu | |
| 2002/0010781 A1 | 1/2002 | Tuatini | |
| 2002/0026473 A1 | 2/2002 | Gourraud | |
| 2002/0091757 A1* | 7/2002 | Cuomo et al. | 709/203 |
| 2002/0107992 A1* | 8/2002 | Osbourne et al. | 709/310 |
| 2002/0161826 A1 | 10/2002 | Arteaga et al. | |
| 2003/0005174 A1 | 1/2003 | Coffman et al. | |
| 2003/0014733 A1* | 1/2003 | Ringseth et al. | 717/116 |
| 2003/0041178 A1* | 2/2003 | Brouk et al. | 709/238 |
| 2003/0055920 A1 | 3/2003 | Kakadia et al. | |
| 2003/0061404 A1 | 3/2003 | Atwal et al. | |
| 2003/0074579 A1 | 4/2003 | Della-Libera et al. | |
| 2003/0093500 A1 | 5/2003 | Khodabakchian et al. | |
| 2003/0101210 A1 | 5/2003 | Goodman et al. | |
| 2003/0120665 A1* | 6/2003 | Fox et al. | 707/100 |
| 2003/0145281 A1 | 7/2003 | Thames et al. | |
| 2003/0204644 A1 | 10/2003 | Vincent | |
| 2004/0030947 A1 | 2/2004 | Aghili et al. | |
| 2004/0088140 A1 | 5/2004 | O'Konski et al. | |
| 2004/0133633 A1 | 7/2004 | Fearnley et al. | |
| 2004/0186817 A1 | 9/2004 | Thames et al. | |
| 2004/0193703 A1 | 9/2004 | Loewy et al. | |
| 2004/0216127 A1* | 10/2004 | Datta et al. | 719/313 |
| 2004/0225724 A1 | 11/2004 | Pavlik et al. | |
| 2005/0027853 A1 | 2/2005 | Martin et al. | |
| 2005/0038708 A1 | 2/2005 | Wu | |
| 2006/0031481 A1 | 2/2006 | Patrick et al. | |
| 2006/0173985 A1 | 8/2006 | Moore | |
| 2006/0195819 A1 | 8/2006 | Chory et al. | |
| 2006/0206440 A1 | 9/2006 | Anderson et al. | |
| 2006/0224702 A1 | 10/2006 | Schmidt et al. | |
| 2006/0224750 A1 | 10/2006 | Davies et al. | |
| 2006/0230432 A1 | 10/2006 | Lee et al. | |
| 2007/0174393 A1 | 7/2007 | Bosschaert et al. | |
| 2008/0059220 A1 | 3/2008 | Roth et al. | |
| 2008/0148346 A1 | 6/2008 | Gill et al. | |
| 2008/0172270 A1 | 7/2008 | Eckenroth | |
| 2009/0319832 A1 | 12/2009 | Zhang et al. | |
| 2009/0326997 A1 | 12/2009 | Becker et al. | |
| 2010/0017853 A1 | 1/2010 | Readshaw | |
| 2010/0030718 A1 | 2/2010 | Anderson et al. | |
| 2010/0304992 A1 | 12/2010 | An et al. | |

OTHER PUBLICATIONS

Bray, Tim, et al., *Extensible Markup Language (XML) 1.0 (Second Edition)*, World Wide Web Consortium, W3C Recommendation Oct. 6, 2001, <http://www.w3.org/TR/REC-xml>, pp. 1-44, downloaded Jul. 11, 2003.

Fallside, David C., *XML Schema Part 0: Primer*, World Wide Web Consortium, W3C Recommendation, May 2, 2001, <http://www.w3.org/TR/xmlschema-0/>, pp. 1-57, downloaded Jul. 11, 2003.

Clark, James, et al., *XML Path Language (Xpath)*, World Wide Web Consortium, W3C Recommendation, Nov. 16, 1999, <http://www.w3.org/TR/xpath>, pp. 1-28, downloaded Jul. 11, 2003.

Thompson, Henry S., et al., *XML Schema Part 1: Structures*, World Wide Web Consortium, W3C Recommendation, May 2, 2001, <http://www.w3.org/TR/xmlschema-1/>, pp. 1-151, downloaded Jul. 11, 2003.

Biron, Paul V., et al., *XML Schema Part 2: Datatypes*, World Wide Consortium, W3C Recommendation, May 2, 2001, <http://www.w3.org/TR/xmlschema-2/>, pp. 1-116, downloaded Jul. 11, 2003.

Clark, James, *XSL Transformations (XSLT) Version 1.0*, World Wide Consoritum, W3C Recommendation, Nov. 16, 1999, <http://www.w3.org/TR/xslt>, pp. 1-119, downloaded Jul. 23, 2003.

Box, Don, et al., *Simple Object Access Protocol (SOAP) 1.1*, World Wide Web Consortium, W3C Note, May 8, 2000, <http://www.w3.org/TR/2000/NOTE-SOAP-20000508/>, pp. 1-27, downloaded Jul. 23, 2003.

Merrick, Phillip, et al., *Web Interface Definition Language (WIDL)*, World Wide Web Consortium, Submitted to W3C Sep. 22, 1997, © 1997 webMethods, Inc. <http://www.w3.org/TR/NOTE-widl>, pp. 1-15, downloaded Aug. 11, 2003.

Barton, John J., et al., *SOAP Messages with Attachments*, World Wide Web Consortium, W3C Note Dec. 11, 2000, <http://www.w3.org/TR/SOAP-attachments>, pp. 1-8, downloaded Jul. 24, 2003.

Copyright © UN/CEFACT and OASIS, 2001, *Message Service Specification, ebXML Transport, Routing, & Packaging, Verion 1.0*, May 11, 2001, <http://www.ebxml.org/specs/ebMS.pdf>, pp. 1-75.

Copyright © OASIS, 2001, *Oasis/ebXML Registry information Model v1.0 DRAFT, OASIS/ebXML Registry Technical Committee*, Jun. 27, 2001, <http://www.oasis-open.org/committees/regrap/documents/rimv1.0.doc>, pp. 1-43.

Office Action dated Mar. 28, 2005 from U.S. Appl. No. 10/015,502.
Final Office Action dated Oct. 18, 2005 from U.S. Appl. No. 10/015,502.
Office Action dated Aug. 5, 2005 from U.S. Appl. No. 10/015,501.
"A powerful new tool to help validated error-handling code," Nov. 2004, pp. 1-4, Compuware Corporation.
"Agitator," online retrieved on Feb. 15, 2005) Retrieved from the internet ,URL:http://www.agitar.com/products/000024.html., pp. 1-5, Agitar Software, Inc.
"AmberPoint Express", (online, retrieved on Dec. 23, 2004), Retrieved from the internet, URL:http://www.amberpoint.com/solutions/express_print.html., pp. 1-2, AmberPoint Solutions.
"Extensible Markup Language (XML) 1.0 (Second Edition)", Oct. 6, 2000 (online, retrieved on Aug. 3, 2006), Retrieved from the internet <URL:htt;://www.w3.org/TR/2000/REC-xml20001006>, pp. 1-59, W3C.

"Interoperability: The Key to Quality Web Services," Mar. 2004 (online) retrieved on Nov. 17, 2004; Retrived from the internet: <URL:http:://www.mindreef.com/products.whitepapers/whitepaper-2html>, pp. 1-9, Mindreef, Inc., (no longer available on the internet).

"ProactiveNet 6.0 Optimize Application Performance to Meet Business Objectives" 2004, pp. 1-4, ProactiveNet, Inc., CA.

Abbreviated Examination Report, GB0517847.0, Dec. 1, 2005 (1 page).

Barton, J.J. et al., "Soap Messages with Attachments," World Wide Web Consortium, W3C Note, Dec. 11, 2000, retrieved online on Jul. 24, 2003, from <URL:http://www.w3.org/TR/SOAP-attachments> (8 pages).

Bilorusets et al.; Web Services Reliable Messaging Protocol (WS-ReliableMessaging); Feb. 2005; http://msdn.microsoft.com/library/en-us/dnglobspec/html/WS-ReliableMessaging.pdf (40 pages).

Biron P.V. et al., "XML Schema Part 2: Datatypes," World Wide Web Consortium, W3C Recommendation, May 2, 2001, retrieved online Jul. 11, 2003, retrieved from <URL:http://www.w3.org/TR/xmlschema-2> (116 pages).

Box, D. et al., "Simple Object Access Protocol (SOAP) 1. 1," World Wide Web Consortium, W3C Note, May 8, 2000, retrieved online on Jul. 23, 2003, retrieved from <URL:http://www.w3.org.TR/2000/NOTE-SOAP-20000508/> (28 pages).

Bray, T. et al., Extensible Markup Language (XML) 1.0 (Second Edition), World Wide Web Consortium, W3c Recommendation, Oct. 6, 2001, retrieved online on Jul. 11, 2003, retrieved from RL:http://www.w3.org/TR/REC-xml> (44 pages).

Christensen, E. et al., "Web Services Description Language (WSDL) 1.1," World Wide Web Consortium, W3C Note, Mar. 15, 2001, retrieved online on Jul. 11, 2003, retrieved from <URL:http://www.w3.org.Tr/wsdl> (40 pages).

Clark, J. et al., "XML Path Language (Xpath)," World Wide Web Consortium, W3C Recommendation, Nov. 16, 1999, retrieved online on Jul. 11, 2003, retrieved from <URL:http://www.w3.org/TR/xpath> (119 pages).

Clark, J., "XSL Transformations (XSLT) Version 1.0," World Wide Consortium W3C Recommendation, Nov. 16, 1999, retrieved online on Jul. 11, 2003, retrieved from <URL:http://www.w3.org/TRxsit> (28 pages).

Copyright © OASIS, 2001, "Oasis/ebXML Registry Information Model v1.0 DRAFT, Oasis/ebXML Registry Technical Committee," retrieved online on Jun. 27, 2001, retrieved from <URL:http://www.oasis-open.org/committees/regrap/documents/rimv1.0.doc> (43 pages).

Copyright © UN/CEFACT and Oasis, 2001, "Message Service Specification, ebXML Transport, Routing & Packaging, Version 1.0," retrieved online on May 11, 2001, retrieved from <URL:http://www.ebxml.org/specs/ebMS.pdf> (75 pages).

Corba Messaging 22: Common Object Request Broker Architecture (CORBA), v3.0.3; Mar. 2004; http://www.omg.org/docs/forma1/04-03-12.pdf (p. 85, total: 100 pages).

Fallside, D.C., "XML Schema Part 0: Primer," World Wide Web Consortium, W3C Recommendation, May 2, 2001, retrieved on Jul. 11, 2003, retrieved from <URL:http://www.w3.org/TR/xmischema-0> (57 pages).

Final Office Action dated Oct. 18, 2005 from U.S. Appl. No. 10/015,502 (29 pages).

Martin, B. "Build distributed applications with Java and XML," Feb. 2000, (online, retrieved on Jun. 10, 2005), Retrieved from the internet ,URL: http://www.javaworld.com/javaworld/jw02-2000/JW-02-ssj-xml_phtml>, pp. 1-3 Java World.

Merrick, P. et al., "Web Interface Definition Language (WIDL)," World Wide Web Consortium, Submitted to W3C Sep. 22, 1997, © 1997, webMethods, Inc., retrieved online on Aug. 11, 2003, retrieved from <URL:http://www.w3.org/Tr/Note-widl> (16 pages).

Mitchko, J. "Mindreef SOAPscope 1.0", (online, retrieved on Sep. 27, 2004), retrieved from the internet <URL:http://www.sys-con.com/webservices/articleprint.cfm?id+597., pp. 1-3, SYS-CON Media, Inc.

Notification Service Specification; Object Management Group; Version 1.1 formal/Oct. 13, 2004; Oct. 2004; http://www.omg.org/docs/forma1/04-10-13.pdf (118 pages).

Office Action dated Aug. 5, 2005 from U.S. Appl. No. 10/015,501 (8 pages).

Office Action dated Mar. 28, 2005, issued in U.S. Appl. No. 10/015,502 (26 pages).

Schaffner, Brian, "Debug SOAP apps with Apache TCP Tunnel/Monitor", Jan. 30, 2003 (online, retrieved on Dec. 23, 2004), Retrieved from the internet, URL:hhtp://www.builder.com.com/5102-6389-1049605.html., pp. 1-2, CNET Networks, Inc.

Thompson, H.S. et al., "XML Schema Part 1: Structures," World Wide Web Consortium, W3C Recommendation, May 2, 2001, retrieved on Jul. 11, 2003, retrieved from <URL:http://www.w3.org/TR/xmischema-1> (151 pages).

Transmission Control Protocol; Darpa Internet Program Protocol Specification; Sep. 1981; http://www.ietf.org/rfc/rfc0793.txt?number=793 (84 pages).

Web Services Reliable Messaging TC WS-Reliability 1.1; OASIS Open 2003-2004; Oasis Standard , Nov. 15, 2004; http://docs.oasis-open.org/wsrm/ws-reliability/v1.1/wsrm-ws_reliability-1.1-spec-os.pdf (74 pages).

* cited by examiner

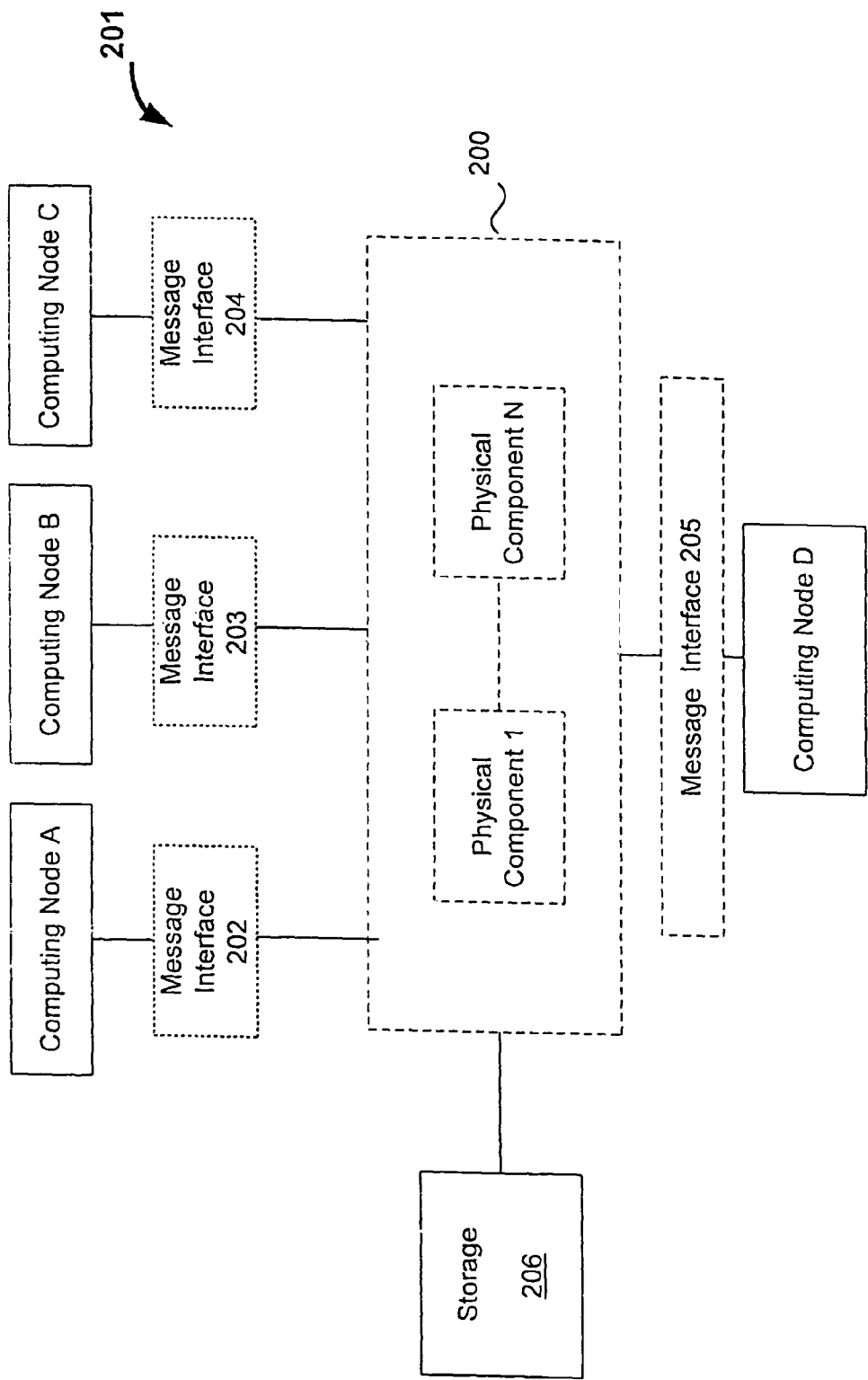

MESSAGE PROCESSING FOR DISTRIBUTED COMPUTING ENVIRONMENTS

CROSS-REFERENCE TO RELATED APPLICATIONS

This application claims the benefit of priority from U.S. Provisional Patent Application No. 60/394,109, filed on Jul. 2, 2002 and entitled "MESSAGE PROCESSING FOR DISTRIBUTED COMPUTING ENVIRONMENTS," which is hereby incorporated herein by reference.

This application is related to U.S. patent application Ser. No. 10/015,501, entitled "TRAFFIC MANAGER FOR DISTRIBUTED COMPUTING ENVIRONMENTS," which is hereby incorporated herein by reference.

This application is related to U.S. patent application Ser. No. 10/015,502, also entitled "TRAFFIC MANAGER FOR DISTRIBUTED COMPUTING ENVIRONMENTS," which is hereby incorporated herein by reference.

BACKGROUND OF THE INVENTION

1. Field of the Invention

The present invention relates to distributed computing environments, and more particularly to communication between various programs operating in the distributed computing environments.

2. Description of the Related Art

Recently, distributed computing environments have become widespread. Accordingly, extensive efforts have been made to facilitate communication between the various computing nodes which typically operate in such environments. One such effort is the development of the Simple Object Access Protocol (SOAP). SOAP is a standard which can be used to facilitate communication between different computing nodes operating in different platforms (or operating systems). As such, SOAP provides a way for a computing program (program) running in one kind of operating system (e.g., Windows 2000) to communicate with another computer program which is running in another kind of operating system (e.g., Linux).

Typically SOAP uses Extensible Markup Language (XML) and a transport protocol (such as HTTP, SMTP, MQ, etc.) as the mechanisms for information exchange. SOAP specifies how to encode an XML file so that a computer program running in one computer can call a computer program in another computer. This allows the computer program running in the first computer to send information to the program running in the other computer (e.g., one program to call another program). In addition, SOAP specifies how the called program can return a response. Since HTTP and XML Web protocols are usually installed and available for use in most operating platforms, SOAP provides a readily available solution to the difficult problem of allowing computer programs running in different environments to communicate with each other.

A major design goal for SOAP is simplicity and extensibility. This means that there are several features of traditional messaging systems and distributed object systems that are not part of the core SOAP specification. Accordingly, SOAP can be used as a lightweight protocol for exchange of information in a decentralized, distributed environment. As an XML based protocol, SOAP can consist of three parts: an envelope that defines a framework for describing what is in a message and how to process it, a set of encoding rules for expressing instances of application-defined data types, and a convention for representing remote procedure calls (RPC) and responses.

The SOAP envelope construct defines an overall framework for expressing what is in a message, who should deal with it, and whether it is optional or mandatory. The SOAP encoding rules define a serialization mechanism that can be used to exchange instances of application-defined data types. The SOAP RPC representation defines a convention that can be used to represent remote procedure calls and responses. SOAP does not itself define any application semantics, such as a programming model or implementation specific semantics. Instead, it defines a simple mechanism for expressing application semantics by providing a modular packaging model and encoding mechanisms for encoding data within modules. This allows SOAP to be used in a large variety of systems. Accordingly, it highly desirable to provide a communication environment which can use SOAP or similar protocols.

Unfortunately, conventional approaches fail to solve many other problems associated with communication between computer programs in distributed computing environments. One such shortcoming is that the conventional approaches fail to provide a solution which can simultaneously and efficiently bridge the many disparate characteristics which typically exist between the nodes that make up a distributed computing environment. Even in cases where a solution can be provided to account for a particular type of difference (e.g., relating to security features) between various nodes, typically a costly and/or ad hoc approach is used. To illustrate, FIG. 1 depicts a conventional distributed computing environment 100. As shown in FIG. 1, several interfaces are implemented and maintained to facilitate communication between a few client and server programs.

Accordingly, conventional approaches do not provide a comprehensive approach to bridging these differences. This means that in order to facilitate communication between the numerous nodes and programming environments that typically make up a distributed computing environment, a tremendous amount of resources have to be deployed to painstakingly implement each desirable feature between each and every program on each and every node. The inefficiencies inherent in such an approach are manifest.

In view of the foregoing, improved techniques for allowing communication in distributed computing environments are needed.

SUMMARY OF THE INVENTION

The invention pertain to techniques for representation of data representations which are associated with processing of messages (message processing representations). In accordance with one embodiment of the invention, a message server suitable for storing message processing representations is disclosed. As will be appreciated, the message server provides a flexible environment which is better suited for creation and maintenance of message processing representations. The message processing representations can, for example, be rules/policies, service request roles and service/operation definitions. In any case, the message processing representations can typically be used to perform message processing.

In addition, the message server is also capable of generating pre-computed data suitable for runtime processing of messages. As will be appreciated, the pre-computed data can be used to improve runtime processing of messages. As result, many problems associated with message processing in conventional distributed computing environments can be addressed. These problems include, for example, high hardware costs associated with adding a message server to manage web services message traffic; administration costs associated with coordinating, planning, and synchronizing updates to the multiple message servers required to handle a given volume of traffic and administration costs associated with insuring consistent policies and practices across various computing nodes.

The invention can be implemented in numerous ways, including as a method, an apparatus, and a computer readable medium. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2 is a simplified block diagram of a computing environment with reference to which a generalized embodiment of the present invention is described.

DETAILED DESCRIPTION OF THE INVENTION

Figure 1:
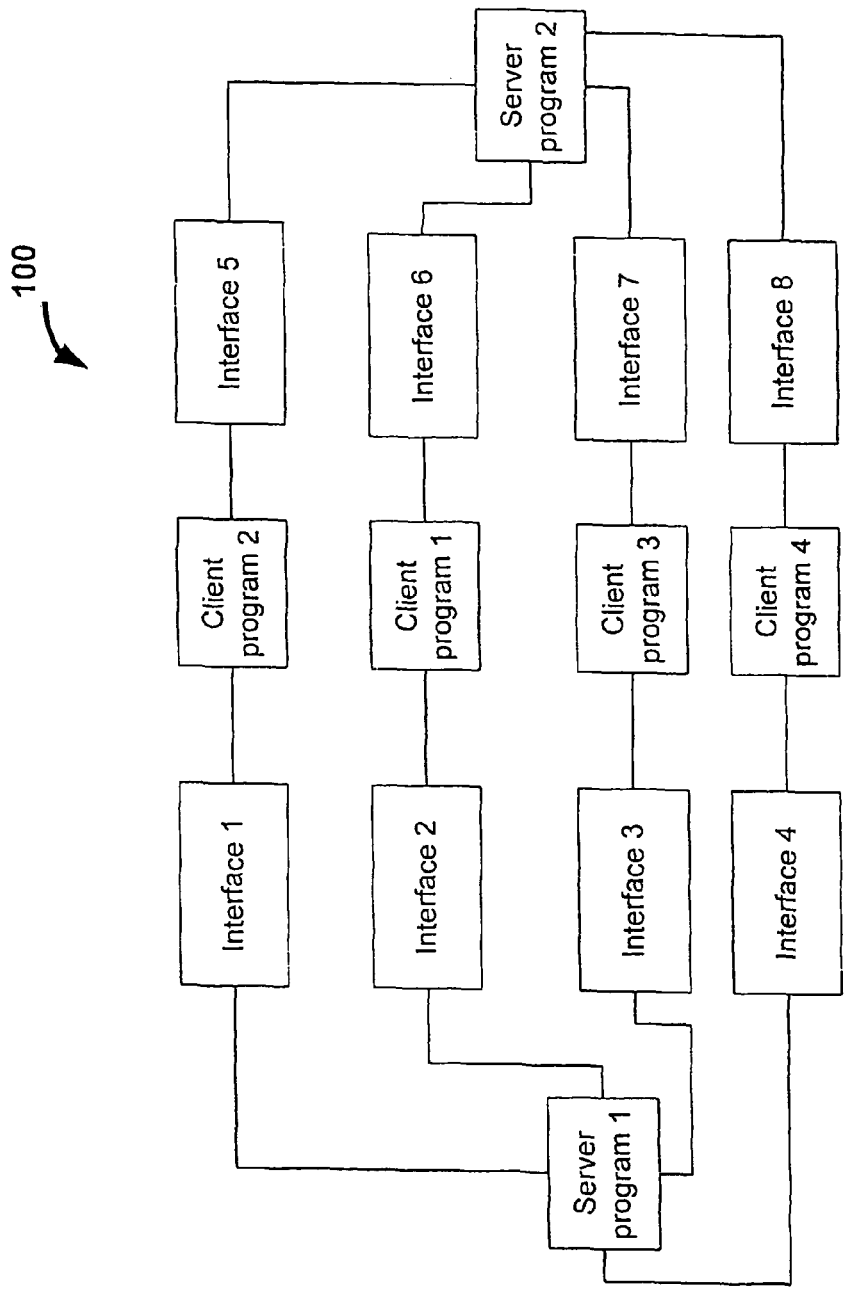
FIG. 1 depicts a conventional distributed computing environment.

As noted in the background, extensive efforts have been made to facilitate communication between various computing nodes which make up a distributed computing environment. Unfortunately, conventional approaches fail to solve many problems associated with communication between computer programs in distributed computing environments. One such shortcoming is that the conventional approaches fail to provide a solution which can simultaneously and efficiently bridge the many disparate characteristics which typically exist between the nodes that make up a distributed computing environment.

Accordingly, the invention pertains to techniques suitable for facilitating communication between various computer programs operating on various nodes in a distributed computing environment. In accordance with one aspect of the invention, a message server (or traffic manager) is disclosed. The message server can also be referred to as traffic manager since the message server is capable of monitoring traffic exchanged between client and server programs operating in the distributed computing environment. Moreover, the message server can be used to implement a variety of desirable features across different computing environments. These computing environments are typically separated by one or more distinguishing characteristics. As will be appreciated, the message server provides an integral and cost effective solution which can bridge these distinguishing characteristics as well as define and enforce policies across disparate applications and computing environments.

According to various embodiments, this is achieved by centralizing the generation of interfaces which allow interaction between any of the nodes in a distributed computing system. That is, instead of enabling each node to generate the necessary interfaces for communicating with each other type of node in the system, the present invention abstracts and centralizes this function so that a single node or set of nodes is responsible for affecting the communication between disparate nodes. This avoids the redundancy and inefficiency inherent in building these capabilities in each node, particularly in complex systems. Another advantage is that the present invention can provide control for enforcing Information Technology (IT) and/or business policies and procedures. This can be achieved when the interfaces are compatible or incompatible.

Embodiments of the invention are discussed below with reference to FIGS. 2-13. However, those skilled in the art will readily appreciate that the detailed description given herein with respect to these figures is for explanatory purposes as the invention extends beyond these limited embodiments.

FIG. 2 is a simplified block diagram of a computing environment 201 with reference to which a generalized embodiment of the present invention will be described. The distributed computing environment 201, which can be any of a wide variety of distributed computing environments, includes computing nodes A, B and C which can communicate with the computing node D. By way of example, various client programs can be running in each of the computing nodes A, B, and C and a server program can be running in the node D. Typically, the client programs running in the computing nodes A, B and C request one or more services from one or more server programs running in the computing node D.

These requests for services are managed by the intermediary Message server 200 as described below.

As will be appreciated, the message 200 can be implemented using one or more physical components (physical components 1-N). Each of these physical components can, for example, be a computing node with memory and a central processing unit. In any case, the message server 200 facilitates communication between any of the computing nodes in the distributed computing environment 201. Message server 200 can publish one or more message interfaces, for example, message Interfaces 202, 203 and 204. The message Interfaces 202, 203 and 204 can respectively be used by the computing nodes A, B and C. In other words, various client programs running on different computing nodes in the computing environment 201 can use a different message interface in order to invoke services which are provided by one or more programs running on computing node D.

According to a more specific embodiment, the message server 200 operates to manage the data traffic in the computing environment 201. That is, the message server 200 monitors the data generated by the computing nodes A, B and C and determines whether the data should be transmitted to the computing node D. Moreover, the message server 200 maps a set of service requests generated by the client programs running in computing nodes A, B and C into a set of service requests which are directed to one or more server programs running in the computing node D. As such, the message server 200 may perform a mapping between two application interfaces.

As illustrated in FIG. 2, the message server 200 can facilitate mapping of, for example, the message interface 202 to a second message interface 205. As will be appreciated, this mapping can be done based on at least one policy. Such policies are typically implemented to bridge one or more disparate characteristics that exist between the computing nodes A, B, C, and D, and/or to enforce common procedures or policies within a homogenous environment and may be implemented using rules stored in a storage medium 206 associated with the message server 200.

Figure 3A:
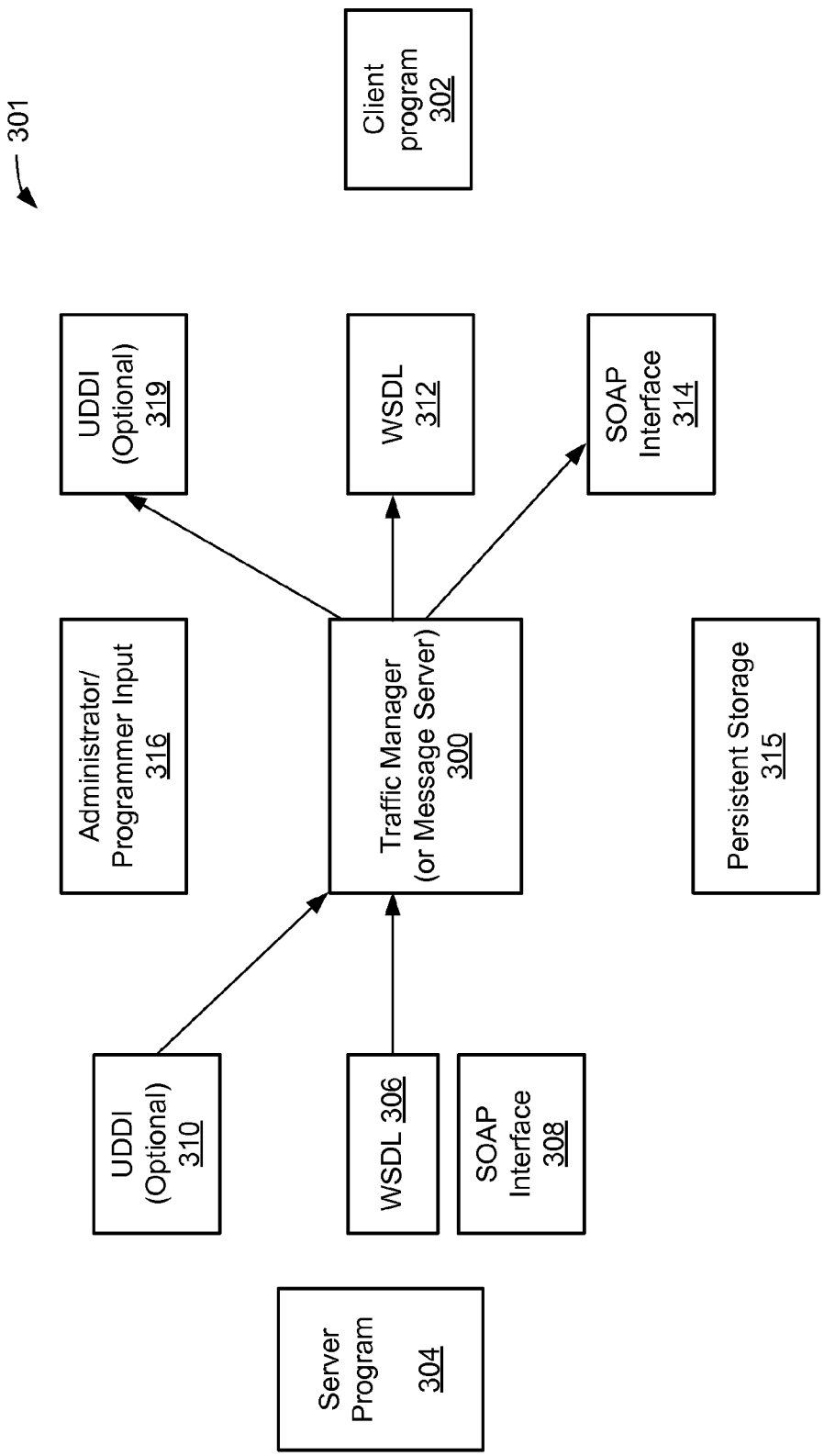
FIGS. 3A-3B illustrate a traffic manager operating in a distributed computing environment in accordance with a more specific embodiment of the invention.

FIG. 3A illustrates a message server 300 operating in a distributed computing environment 301 in accordance with a more specific embodiment of the invention. In the described embodiment, the message server 300 uses the Simple Object Access Protocol (SOAP) in order to facilitate communication between a client program 302 and a server program 304. Programs 302 and 304 may each reside on one or more computing nodes in any of a wide variety of network topologies. For example, client program 302 may reside on a single client machine while server program 304 is distributed across a plurality of servers. In addition, the nodes on which programs 302 and 304 reside may be on the same local area network (LAN) or in a wide area network (WAN) such as the Internet or World Wide Web. Regardless of the network topology in which the programs are operating, the message server 300 allows the client program 302 to access (or invoke) one or more services provided by the server program 304 using the Simple Object Access Protocol. The data transmitted between programs 302 and 304 can be, for example, in Extensible Markup Language (XML) format. It should be noted that other formats, for example, multimedia formats or office file formats (e.g., .jpeg, .wav, .doc, etc.) can be attached.

In response, for example, to a request received from the client program 302, the message server 300 can read a Web Services Description Language (WSDL) file 306 associated with server program 304. The WSDL 306 provides a detailed technical description specifying a SOAP interface 308. The SOAP interface 308 is the interface to the one or more services which are provided by the server program 304. As such, the WSDL provides information about interface 308 so that these services can be accessed. It should be noted that an optional Universal Description, Discovery and Integration directory (UDDI) 310 may initially be accessed in order to, among other things, get information about the WSDL file 306.

In any case, after the message server 300 reads the WSDL file 306, the message server can generate and/or publish one or more corresponding WSDL file 312 and a corresponding SOAP interface 314. In other words, the message server 300 can generate one or more SOAP interfaces (e.g., SOAP Interface 314 shown in FIG. 3A). Typically, the message server 300 may generate multiple variants of the underlying interface (not shown). For example, different variants of the SOAP interface for each security model and/or for different business partners can be generated.

The SOAP Interface 314 may also provide a common interface by which client program 302 and any other program or node in the system may transparently invoke one or more services associated with the server program 304. According to specific embodiments, WSDL file 312 and SOAP interface 314 are generated at least partially based on data stored in a persistent storage medium 315. The data stored in the persistent storage medium 315 can, for example, include rules, policies, a mapping of users with organizational roles (e.g., an LDAP directory), etc. As will be appreciated, these can be used, for example, to define interfaces, approve interfaces, define policies and rules, review operational data, etc.

According to one embodiment, a person (e.g., application developer and/or business analyst, etc.) 316 may interact with the message server 300, for example, through a Graphical User Interface. Accordingly, the WSDL file 312 and SOAP Interface 314 can be generated by the message server 300 at least partly based on input provided by a person. It should also be noted that the message server 300 may optionally publish the WSDL file 312 in a UDDI 319.

Figure 3B:
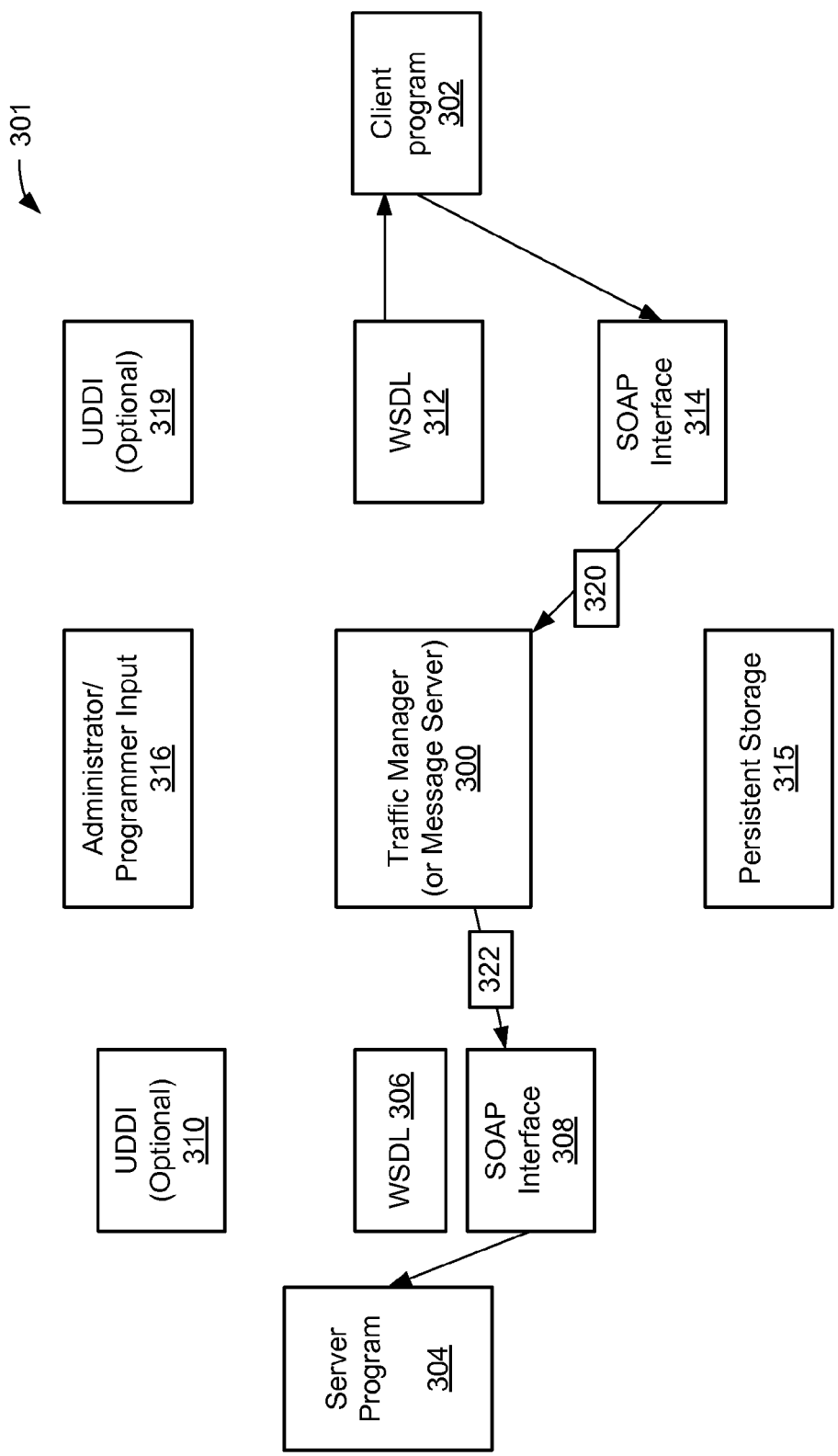

As noted above, the message server 300 generates the corresponding SOAP Interface 314 for the SOAP Interface 308. Accordingly, the client program 302 can access (or invoke) the services provided by the server program 304 through the SOAP interface 314. Referring to FIG. 3B, the client program 302 reads the WSDL file 312 in order to obtain information regarding the SOAP Interface 314. It should be noted that the client program 302 may initially access the optional UDDI 319 in order to locate the WSDL 312 file. In any case, after the client program 302 reads the WSDL file 312, the client program 302 can use the SOAP interface 314 to communicate with the message server 300. Typically, the client program 302 transmits a SOAP message 320 through the SOAP interface 314. The SOAP message can be a request for one or more services from the server program 304. The SOAP message 320 can, for example, include data in an XML format. The SOAP message may also include other attachments (e.g., .gif files, .wav files, etc.).

The message server 300 can, in turn, perform a variety of operations on the SOAP message 320. For example, the message server 300 may discard, hold, store, or forward the SOAP message 320. The message server 300 may also transform the SOAP message 320 into another SOAP message 322 which is sent to the server program 304 and/or one or more other programs (not shown) in the distributed computing environment 301.

As noted above, the SOAP message 320 can be a request for one or more services. Accordingly, the message server 300, among other things, can determine whether a request for invocation of the same and/or different services should be made from the server program 304 and/or other server programs (not shown) in the distributed computing environment 301. This determination can be made at least partially based on the data stored in the persistent storage 315. Based on this determination, the message server 300 can map a request made by the client program 302 through the SOAP Interface 314 to a request for services from the server program 304 through the SOAP Interface 308. In other words, a SOAP message 322 can be generated by the message server 300 and transmitted to the server program 304 and/or other server programs (not shown). The SOAP message 322 corresponds to the SOAP message 320 and can be a request for the same or different set of services provided by the server program 304. Accordingly, the message server 300 can monitor the data traffic between the client program 302 and server program 304 and/or other server or client programs in the distributed computing environment 301.

Moreover, the message server 300 can be used to manage the services provided by the server program 304 and/or other server programs in the distributed computing environment 301. This allows the services which are offered by the server program to be mapped to possibly a different set of services which are actually provided to the client program 302. This provides control over the access of services in a distributed computing environment and allows implementation of various policies across different computing nodes which typically possess one or more disparate characteristics.

Figure 3C:
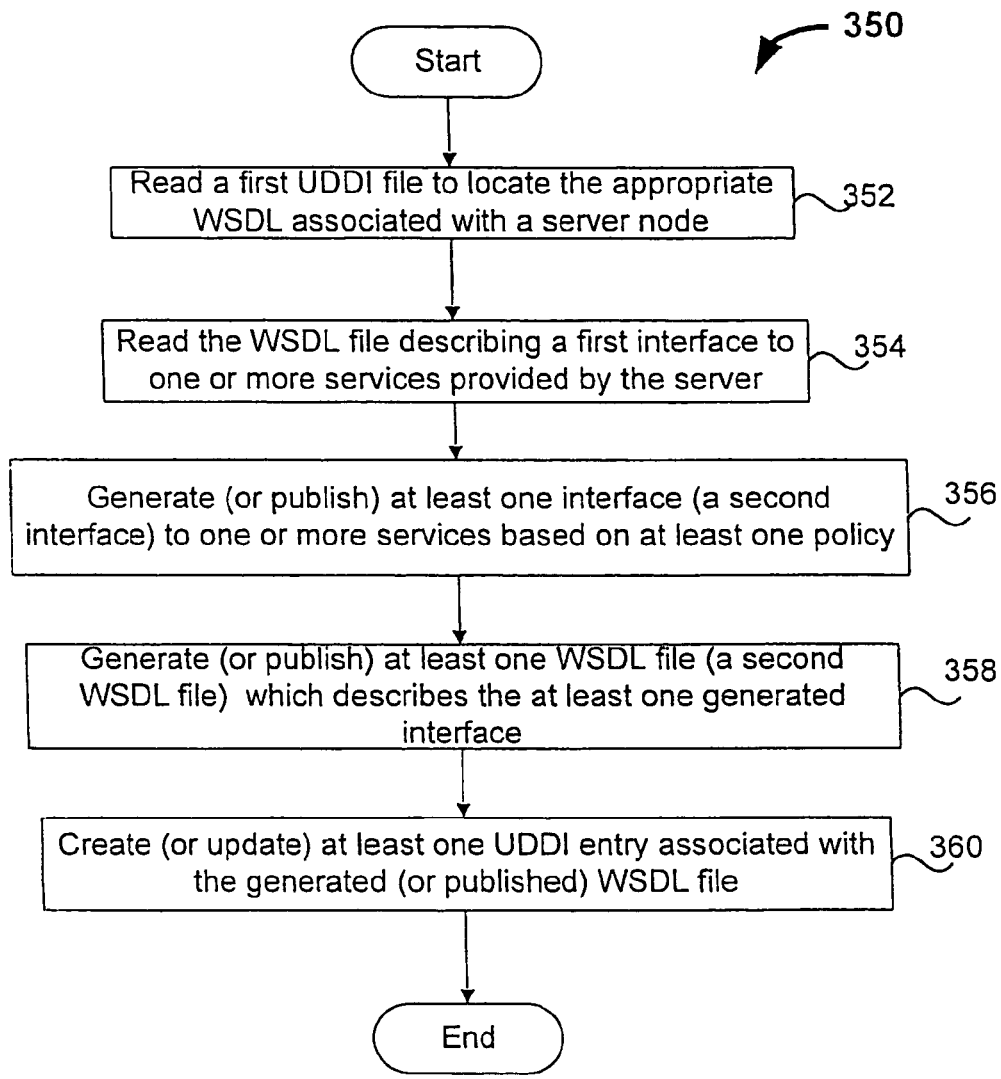
FIG. 3C illustrates a method for facilitating communication between a client node and a server node in a distributed computing environment in accordance with one embodiment of the invention.

FIG. 3C illustrates a method 350 for facilitating communication between a client node and a server node in a distributed computing environment. The method 350 can, for example, be used by the message server 300 of FIGS. 3A and 3B. Initially, at operation 352, a first UDDI is read to locate the appropriate WSDL file associated with an interface to one or more server programs. Next, at operation 354, the WSDL file is read. The WSDL file typically describes a first interface which can be used to access one or more services provided by one or more server programs. Thereafter, at operation 356, at least one interface (a second interface) is generated (or published) based on at least one policy. This provides one or more interfaces to the services provided by the one or more servers. Accordingly, security mapping function can be abstracted and centralized. Again, this avoids the redundancy and inefficiency inherent in building these capabilities in each node, particularly in complex systems. Furthermore, control over enforcement of Information Technology (IT) and/or business policies and procedures can be achieved. It should be noted that this can be achieved when the interfaces are compatible or incompatible.

Accordingly, at operation 358, a second WSDL file which describes the at least one generated (or published) interface is generated (or published). Finally, at operation 360, at least one UDDI entry associated with the generated (or published) WSDL file is created (or updated). The method 350 ends following operation 360.

Figure 3D:
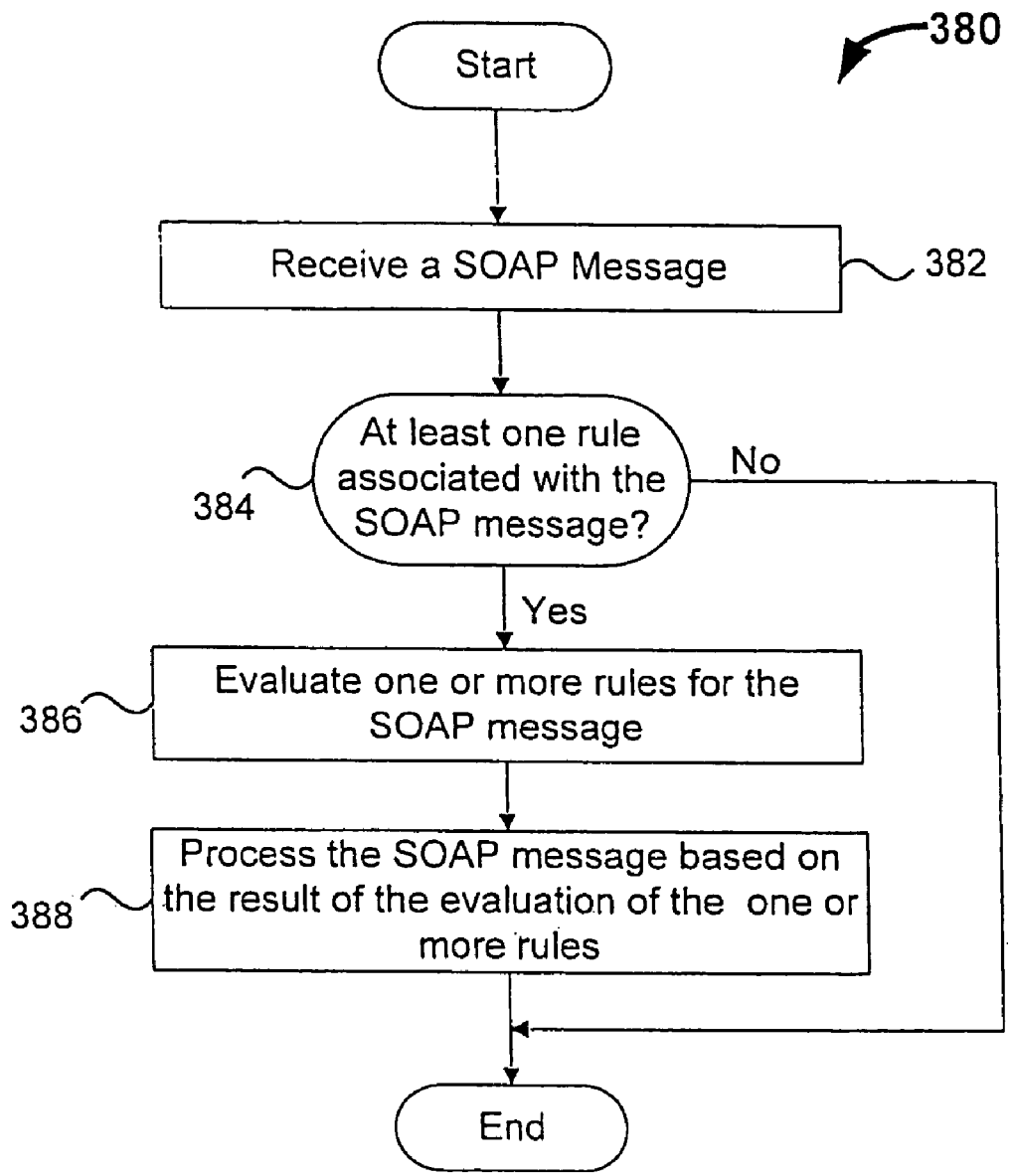
FIG. 3D illustrates a method for processing SOAP messages in accordance with one embodiment of the invention.

FIG. 3D illustrates a method 380 for processing SOAP messages in accordance with one embodiment of the invention. The method 380 can, for example, be used by the message server 300 of FIGS. 3A and 3B. Initially, at operation 382, a SOAP message is received. Next, at operation 384, a determination is made as to whether at least one rule is associated with the SOAP message. Such rules are typically generated with reference to one or more policies. If it is determined at operation 384 that no rule is associated with the SOAP message, the method 380 ends. However, if it is determined at operation 384 that at least one rule is associated with the SOAP message, the method 380 proceeds to operation 386 where any such rule is evaluated for the SOAP message.

Thereafter, at operation 388, the SOAP message is processed based on the result of the evaluation. The method 380 ends following operation 388.

Figure 4:
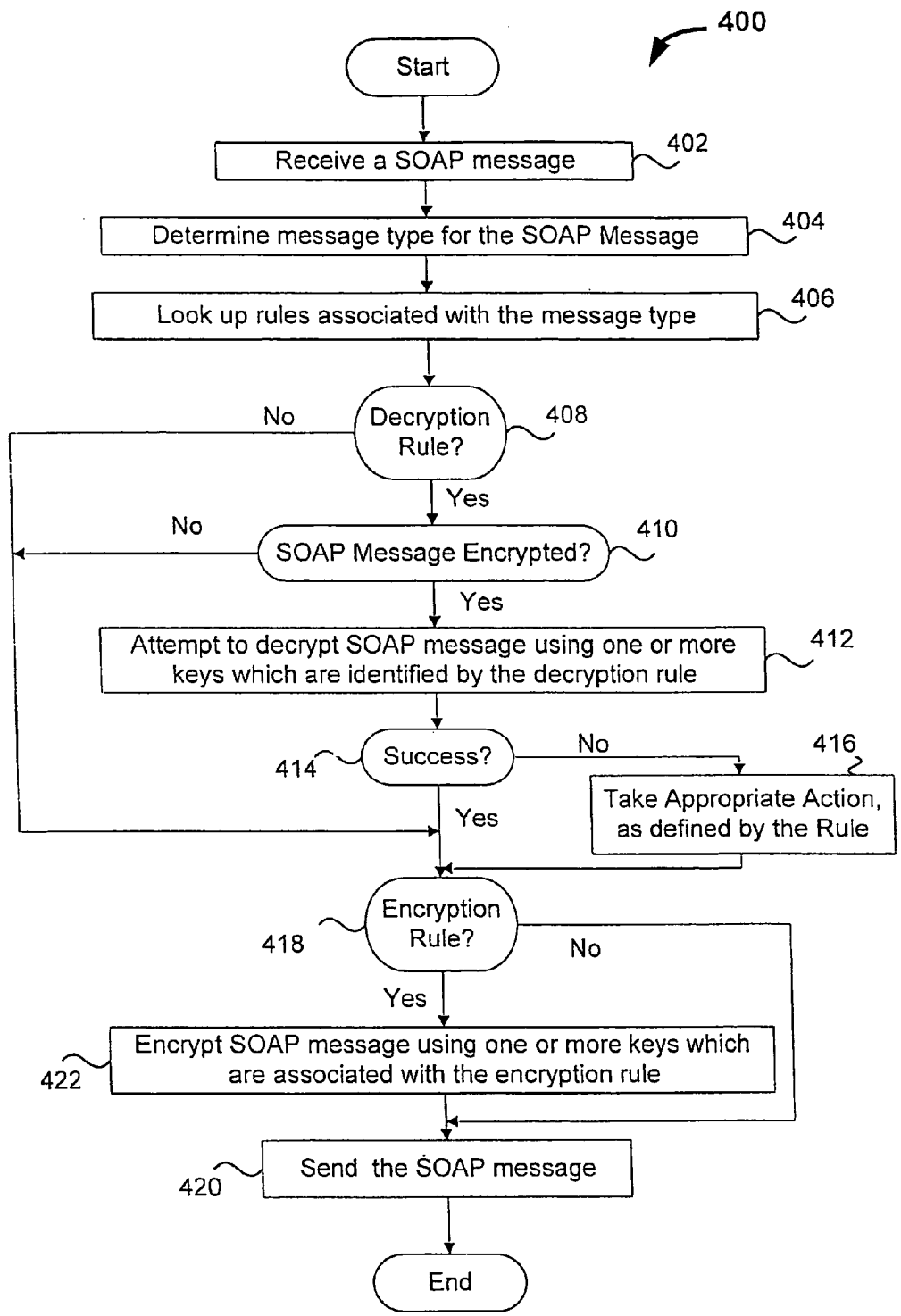
FIG. 4 illustrates a security method suitable for providing security for SOAP messages exchanged between a client and a server program in accordance with one embodiment of the invention.

As noted above, one aspect of the invention allows implementation of various policies across different computing nodes which typically possess one or more disparate characteristics. By way of example, FIG. 4 illustrates a security method 400 suitable for providing security for SOAP messages exchanged between a client and a server program in accordance with one embodiment of the invention. As will be appreciated, the security method 400, for example, is suitable for providing a security model mapping between the client and server programs which operate in a distributed operating environment. Accordingly, security mapping function can be abstracted and centralized so a single node or set of nodes which are responsible for affecting the communications between disparate nodes. Again, this avoids the redundancy and inefficiency inherent in building these capabilities in each node, particularly in complex systems.

Referring to back to FIG. 4, initially, at operation 402, a SOAP message is received. Next, at operation 404, a message type is determined for the SOAP message. Thereafter, at operation 406, the rules associated with the message type are looked up. Accordingly, at operation 408, a determination is made as to whether at least one decryption rule is associated with the SOAP message. If it is determined at operation 408 that at least one decryption rule is associated with the SOAP message, the security method 400 proceeds to operation 410 where a determination is made as to whether the SOAP message is encrypted. If it is determined at operation 410 that the SOAP message is encrypted, the security method 400 proceeds to operation 412 where an attempt is made to decrypt the SOAP message using one or more keys which are identified by at least one decryption rule. The decryption keys typically correspond to (or are managed by) an organization or an organizational rule.

Next, at operation 414, a determination is made as to whether the attempt to decrypt the SOAP message was successful. If it is determined at operation 414 that the attempt to decrypt the SOAP message was not successful, the security method 400 proceeds to operation 416 where appropriate action is taken, as defined by the decryption rule. For example, an alarm can be sent. However, operation 416 is bypassed if it is determined at operation 414 that the attempt to decrypt the SOAP message was successful.

In any case, following operation 416 or directly from operations 408, 410 or 414, the security method 400 can proceed to operation 418 where a determination is made as to whether at least one encryption rule is associated with the SOAP message. If it is determined at operation 418 that no encryption rule is associated with the SOAP message, the security method 400 proceeds to operation 420 where the SOAP message is sent to one or more server programs. The security method 400 ends following operation 420. However, if it is determined at operation 418 that at least one encryption rule is associated with the SOAP message, the security method 400 proceeds to operation 422 where the SOAP message is encrypted using one or more keys which are associated with the encryption rule before the message is sent to one or more server programs at operation 420. In any case, the security method 400 ends following operation 420.

Figure 5:
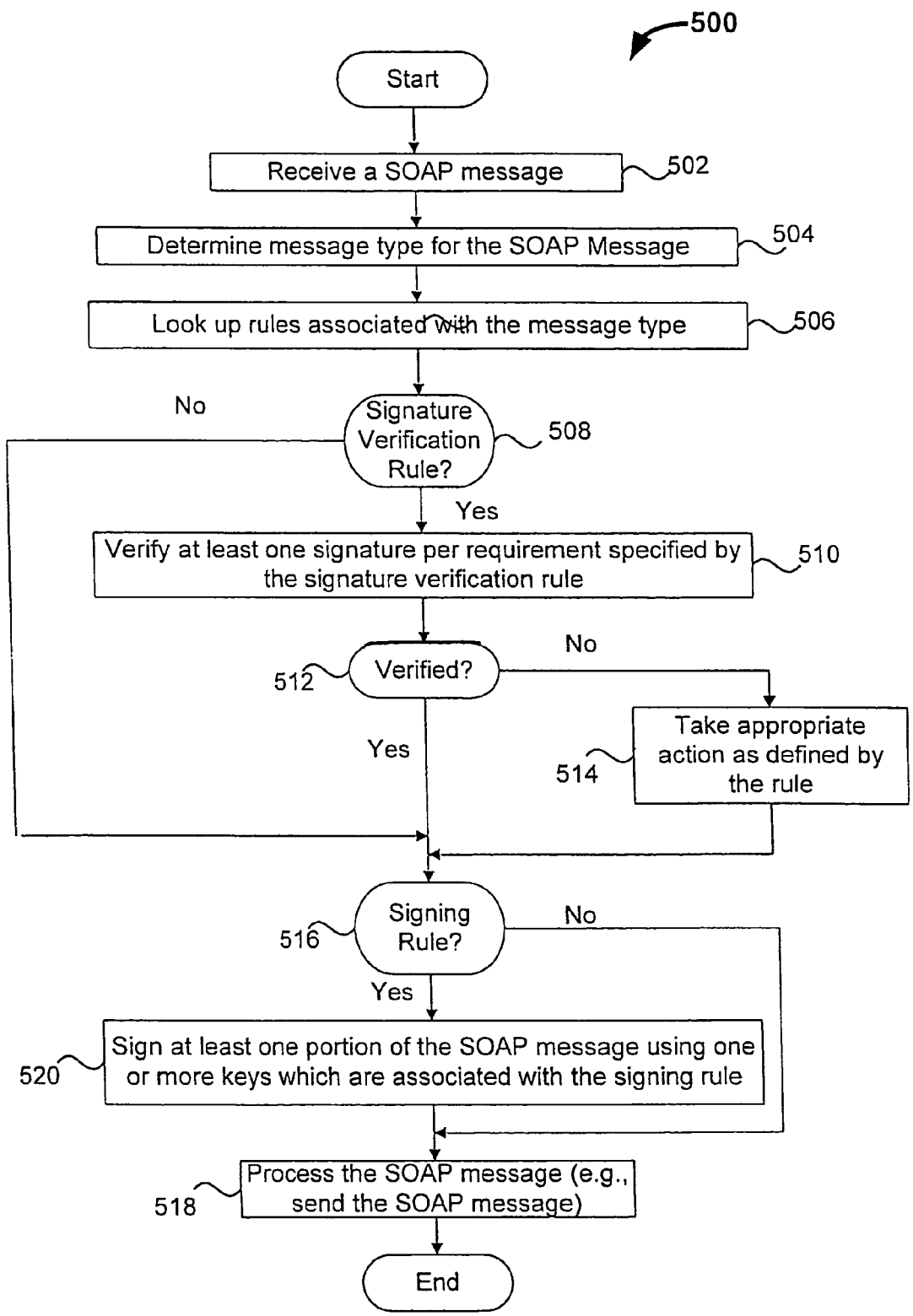
FIG. 5 illustrates a security method suitable for providing security for SOAP messages exchanged between a client and a server program in accordance with another embodiment of the invention.

FIG. 5 illustrates a security method 500 suitable for providing security for SOAP messages exchanged between a client and a server program in accordance with another embodiment of the invention. Similar to the security method 400 of FIG. 4, the security method 500, for example, is suitable for providing a security model mapping between the client and server programs which operate in a distributed operating environment. Accordingly, security mapping function can be abstracted and centralized so a single node or set of nodes which are responsible for affecting the communications between disparate nodes. Again, this avoids the redundancy and inefficiency inherent in building these capabilities in each node, particularly in complex systems.

According to a specific embodiment, the security method 500 can, for example, be used to verify signatures and/or sign messages using keys (or identifiers) which are recognized or used by the client and server programs. Initially, at operation 502, a SOAP message is received. Next, at operation 504, a message type is determined for the SOAP message. Thereafter, at operation 506, the rules associated with the message type are looked up. Accordingly, at operation 508, a determination is made as to whether at least one signature verification rule is associated with the SOAP message. If it is determined at operation 508 that a signature verification rule is associated with the SOAP message, the security method 500 proceeds to operation 510 where at least one signature associated with the SOAP message is verified according to the at least one signature verification rule. Next, at operation 512, a determination is made as to whether the signatures have successfully been verified. If it is determined at operation 512 that the one or more signatures have not been successfully verified, the security method 500 proceeds to operation 514 where appropriate action is taken as defined by the signature verification rule. For example, an alarm can be sent. Thereafter, the security method 500 proceeds to operation 516 where a determination is made as to whether there is at least one signing rule associated with the SOAP message. It should be noted that if it is determined at operation 512 that the one or more signatures have been successfully verified, the security method 500 bypasses operation 514 and proceeds directly to operation 516. It should also be noted that if it is determined at operation 508 that there are no signature verification rules associated with the SOAP message, the security method 500 also directly proceeds to the operation 516.

If it is determined at operation 516 that there are no signing rules associated with the SOAP message, the security method 500 proceeds to operation 518 where the SOAP message is processed (e.g., the SOAP message is sent to one or more servers). The method 500 ends following operation 518. However, if it is determined at operation 516 that there is at least one signing rule associated with the SOAP message, the security method 500 proceeds to operation 520 where at least one portion of the SOAP message is signed using one or more keys which are associated with the at least one signing rule. Thereafter, at operation 518 the SOAP message is processed. The method 500 ends following the operation 518.

Figure 6:
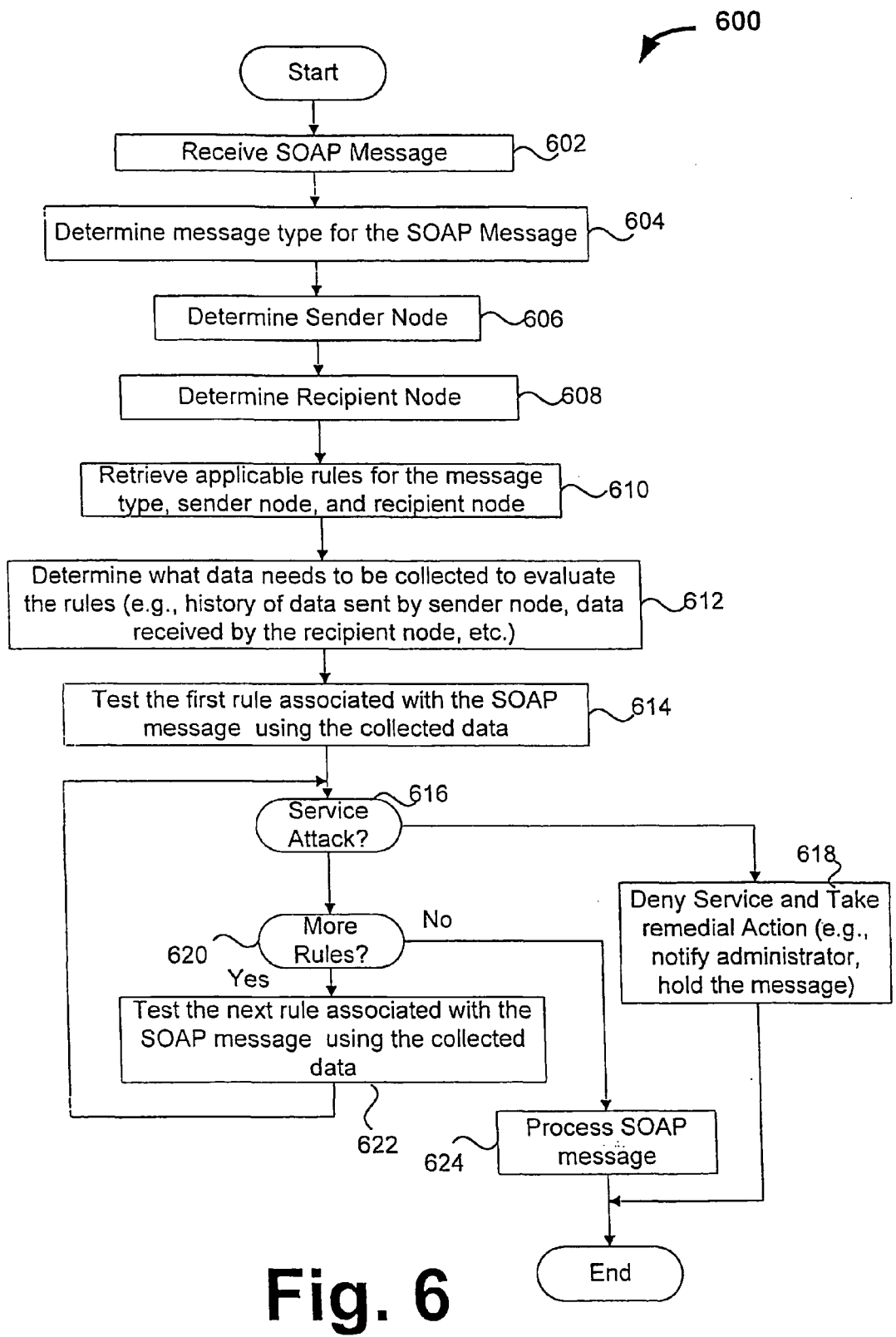
FIG. 6 illustrates a security method for providing security for server programs running in one or more computing nodes in accordance with yet another embodiment of the invention.

FIG. 6 illustrates a security method 600 for providing security for server programs running in one or more computing nodes in accordance with yet another embodiment of the invention. The security method 600 can, for example, be used by the message server 300 of FIGS. 3A and 3B. As will be appreciated, the method 600 is especially suited for protecting server programs against service attacks which are typically initiated by one or more client programs. Initially, at operation 602, a SOAP message is received. The SOAP message is typically a request for one or more services from one or more server programs. Next, at operations 604, 606 and 608 the message type, sender node, and recipient node are respectively determined. Thereafter, at operation 610, applicable rules for the message type, sender node, and recipient node are retrieved. Accordingly, at operation 612, a determination is made as to whether data needs to be collected to evaluate the retrieved rules. The determination made at operation 612 can, for example, determine the extent of the history (or log) for the SOAP messages that need to be considered. Histories (or logs) can be maintained for various message categories. These message categories can, for example, include messages of a particular type, all messages sent by a sender node, messages received by the recipient node, etc.

In any case, after data has been collected, the security method 600 proceeds to operation 614 where the first rule associated with the SOAP message is tested using the collected data. Next, at operation 616, a determination is made as to whether the first rule indicates that a service attack has been made. If it is determined at operation 616 that a service attack has been made, the security method 600 proceeds to operation 618 where service is denied and remedial action is taken. The remedial action taken can, for example, include notifying an administrator, holding the SOAP message, etc. The security method 600 ends following operation 618.

On the other hand, if it is determined at operation 616 that the first rule does not indicate a service attack, the security method 600 proceeds to operation 620 where a determination is made as to whether there are more rules associated with the SOAP message. If it is determined at operation 620 that there are no additional rules associated with the SOAP message, the security method 600 proceeds to operation 624 where the SOAP message is processed (e.g., transformed and/or forwarded). The security method 600 ends following operation 624.

However, if it determined at operation 620 that there is at least one additional rule associated with the SOAP message, the security method 600 proceeds to operation 622 where the next rule associated with the SOAP message is tested using the collected data. Next, the security method 600 proceeds to operation 616 where a determination is made as to whether the rule indicates a service attack. Thereafter, the security method 600 proceeds in the same manner as discussed above. The security method 600 ends either following operation 618 where service is denied and remedial action is taken or after the operation 624 where the SOAP message is processed.

As will be appreciated, one aspect of the invention allows for the enforcement of various policies with respect to the various services provided in a distributed computing environment. In one embodiment, a message server (e.g., message server 300 of FIGS. 3A and 3B) is used to facilitate control over access and/or publication of SOAP interfaces. The message server provides a user interface which is used to interact with the message server. The user interface can be used, for example, by a programmer to make a request with respect to a particular SOAP interface (e.g., publication of a new SOAP interface, modification and/or access to an existing SOAP interface, etc.). The message server may also facilitate the approval process of such requests. That is, the message server can provide a user interface that can be used, for example, by an administrator to facilitate the approval process through interaction with the user interface.

Figure 7:
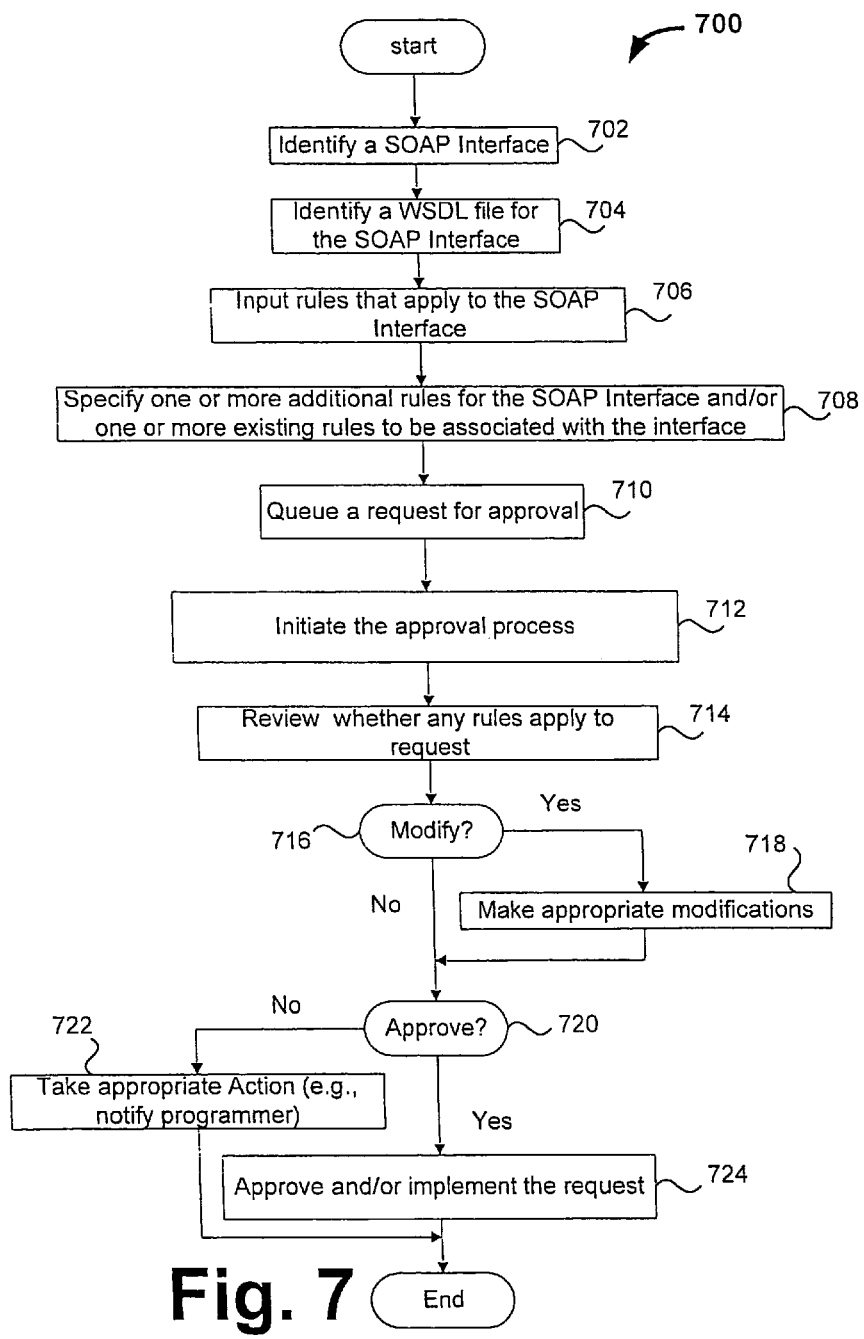
FIG. 7 illustrates a method for controlling access to and/or publication of SOAP interfaces.

FIG. 7 illustrates a method 700 for controlling access to and/or publication of SOAP interfaces. The method 700 can, for example, be used by the message server 300 of FIGS. 3A and 3B. This allows centralized control over the access to and/or publication of the SOAP interfaces. As will be appreciated, this allows implementation and enforcement of policies with respect to access to and/or publication of the SOAP interfaces. Moreover, these policies can be implemented while avoiding the redundancy and inefficiencies inherent in conventional approaches.

Referring back to FIG. 7, initially, at operation 702, a SOAP interface is identified. The SOAP interface can, for example, be a pre-existing SOAP interface or a SOAP interface which has just been developed. By way of example, a programmer (or developer) may identify the SOAP interface by interacting with a user interface of a message server which facilitates the process of controlling access and/or publication of SOAP interfaces. The programmer may, for example, identify a newly developed SOAP interface in order to request approval for publication of the SOAP interface. Alternatively, the programmer may seek permission to access an existing SOAP interface and/or request modifications to it, and so forth.

Similarly, at operation 704, a WSDL file for the SOAP interface is identified. Next, at operation 706, the rules which apply to the SOAP interface are input. This operation can be performed, for example, by the programmer through a user interface associated with the SOAP message server. The SOAP message server can perform a search and output the rules which apply to the SOAP interface. Next, at operation 708, one or more additional rules for the SOAP interface and/or existing rules to be associated with the interface are specified. Again, this operation can be performed, for example, by the programmer through a user interface associated with the SOAP message server.

At operation 710, a request is queued for approval. Next, at operation 712, the approval process for the request is initiated. The approval process can, for example, be initiated by an administrator. The administrator can interact with a user interface of the SOAP message server which facilitates the approval process. At operation 714, a review is made as to whether any existing rules apply to the request (e.g., whether any rules apply to the identified SOAP interface). Again, this determination can, for example, be made by the administrator who uses an interface of the SOAP message server to initiate a search for the applicable rules.

At operation 716 a determination is made as to whether any modifications should be made to what has been requested for approval (e.g., whether modification should be made to the SOAP interface and/or one or more rules). If it is determined at operation 716 that there is a need to make modifications to what has been requested for approval, the method 700 proceeds to operation 718 where appropriate modifications to the request can be made. Next, the method 700 proceeds to operation 720 where a determination is made as to whether the request should be approved. It should be noted that if it is determined at operation 716 that there is no need to make any modifications, the method 700 bypasses operation 718 and proceeds directly to operation 720 where a determination is made as to whether the request should be approved.

In any case, if it is determined at operation 720 that the request should not be approved, the method 700 proceeds to operation 722 where appropriate action can be taken (e.g., the programmer who made the request can be notified). The method 700 ends following operation 722. However, if it is determined at operation 720 that the request should be approved, the method 700 proceeds to operation 724 where the request is approved and/or implemented (e.g., a SOAP interface is published, access to the SOAP interface is allowed, new rules or modification to rules are in effect, etc.). The method 700 ends following operation 724.

Yet another aspect of the invention provides for conditional data processing (or conditional data flow) of messages exchanged between client and server programs in a distributed computing environment. The conditional data processing (or conditional data flow) of messages is another example of the many functionalities that can be provided using the invention. Moreover, this functionality can be abstracted and centralized so as to avoid the redundancy and inefficiency inherent in building these capabilities into each node, particularly in complex systems. Another advantage is that control over enforcement of Information Technology (IT) and/or business policies and procedures can be achieved. This can be achieved when the interfaces are compatible or incompatible.

Figure 8:
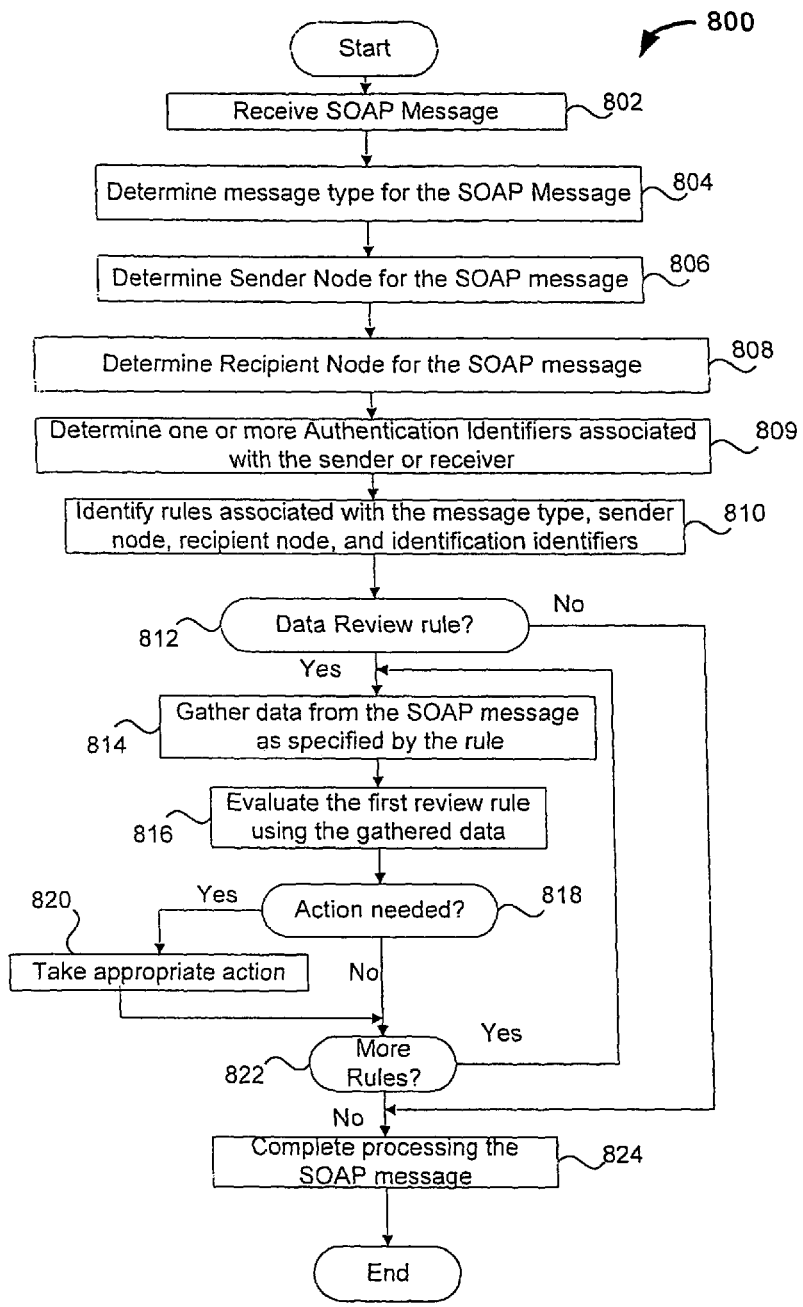
FIG. 8 illustrates a processing method for processing SOAP messages in accordance with one embodiment of the invention.

FIG. 8 illustrates a processing method 800 for processing SOAP messages in accordance with one embodiment of the invention. The processing method 800 can, for example, be used by the message server 300 of FIGS. 3A and 3B. Initially, at operation 802 a SOAP message is received. Next, at operations 804, 806 and 808, the message type, sender node, and recipient node are respectively determined. At operation 809, one or more authentication identifiers are determined. The authentication identifiers can, for example, be associated with the sender or receiver nodes. Thereafter, at operation 810, any rules associated with the message type, sender node, and recipient node are identified. Accordingly, at operation 812, a determination is made as to whether at least one data review or conditional flow rule is associated with the SOAP message. If it is determined at operation 812 that at least one rule is associated with the SOAP message, the processing method 800 proceeds to operation 814 where data is gathered from the SOAP message as specified by the data review/conditional flow rule. Next, at operation 816, the data review/conditional flow rule is evaluated using the data gathered from the SOAP message.

Accordingly, at operation 818, a determination is made as to whether action is required. If it is determined at operation 818 that action is required, the processing method 800 proceeds to operation 820 where appropriate action can be taken. These actions can, for example, include holding the SOAP message, archiving the SOAP message, failing SOAP message delivery, sending a notification, logging special notification, modifying the data in the message, sending side-effect SOAP messages, invoking Java methods and so on.

After appropriate action is taken, the processing method 800 proceeds to operation 822 where a determination is made as to whether there are more data review/conditional flow rules to evaluate. It should be noted that if it is determined at operation 818 that no action is required, the processing method 800 bypasses operation 820 and directly proceeds to operation 822.

If it is determined at operation 822 that there is at least one data review/conditional flow rule to evaluate, the processing method 800 proceeds to operation 814 where data is gathered from the SOAP message as specified by the data review/conditional flow rule. Thereafter, the processing method 800 proceeds in a similar manner as discussed above. On the other hand, if it is determined at operation 822 that there are no data review/conditional flow rules to evaluate, the processing method 800 proceeds to 824 where the processing of the SOAP message is completed (e.g., the SOAP message is delivered). The processing method 800 ends following operation 824.

Other aspects of the invention pertain to techniques for representation of data associated with processing of messages (message processing representations). In accordance with one embodiment of the invention, a message server suitable for storing message processing representations is disclosed. As will be appreciated, the message server provides a flexible environment which is well suited for creation and maintenance of message processing representations needed at design time (design time representations). The design time representations can, for example, be rules/policies, service request roles and service/operation definitions. In any case, the message processing representations can typically be used to perform message processing.

In addition, the message server is also capable of generating pre-computed data suitable for runtime processing of messages. These representations can be referred to as runtime representations. As will be appreciated, the pre-computed data can be used to improve runtime processing of messages. As result, many problems associated with message processing in conventional distributed computing environments can be addressed. These problems include, for example, high hardware costs associated with adding a message server to manage web services message traffic; administration costs associated with coordinating, planning, and synchronizing updates to the multiple message servers required to handle a given volume of traffic and administration costs associated with insuring consistent policies and practices across various computing nodes.

As noted above, design time representations can, for example, be rules/policies, service request roles and service/operation definitions. The design time representations can, for example, be defined based on a policy consideration associated with message processing. In any case, these representations can be defined and/or maintained in a form which is more suitable at design time (e.g., before runtime processing of the message).

Figure 9A:
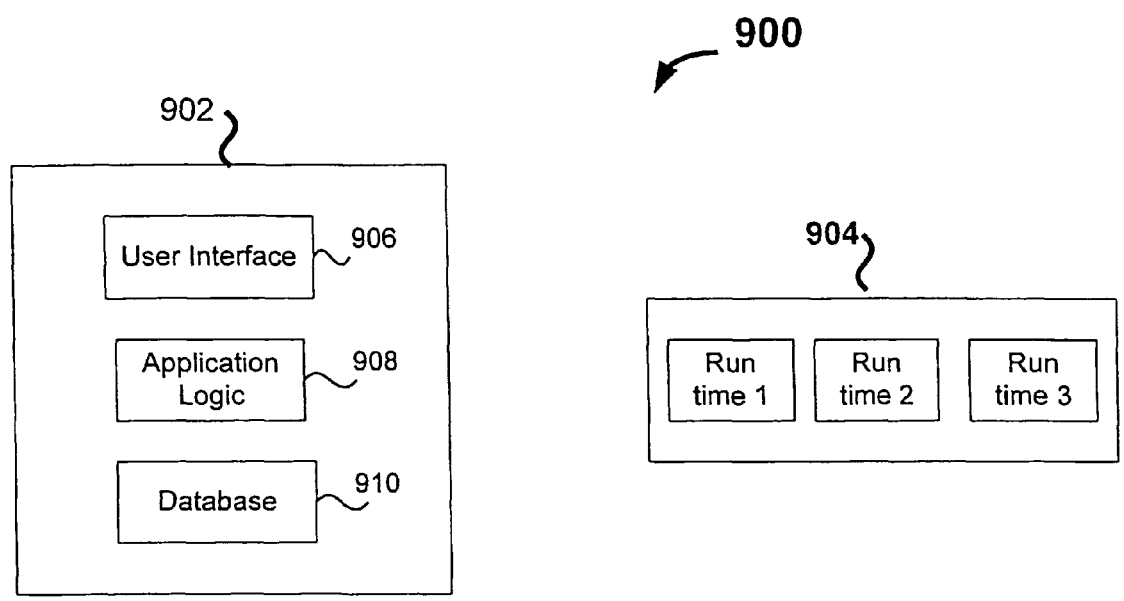
FIG. 9A illustrates a message server in accordance with one aspect of the invention.

FIG. 9A illustrates a message server 900 in accordance with one aspect of the invention. As shown in FIG. 9A, the message server 900 includes a design component 902 and a runtime component 904. The design component 902 includes a user interface 906, an application logic 908 and a database 910. It should be noted that runtime component 904 can be comprised of one or more runtime sub-components. These runtime sub-components may operate alone or collectively to provide message processing capabilities at runtime.

The design component 902 can facilitate generation of design time representations of message processing representations which can be used to process messages. These design time representations can be stored in the database 910. The user interface 906 allows a user (e.g., system administrator, programmer developer, etc.) to conveniently access the database 910 to perform various operations related to design time representations (e.g., define, modify or retrieve a design time representation). It should be noted that the design time representations can be implemented in a way which better serves the design time requirements for representing data associated with message processing. This means that design time representations can be implemented using data structures which are better suited for creating, modifying, or retrieving data. As such, the database 910 can be utilized to meet these needs.

The application logic 908, among other things, can facilitate generation of a set of corresponding runtime representations which can, in turn, be provided to the runtime component 904 (or one or more of its subcomponents). As will be appreciated, the runtime representations can be in a form which is more suitable for processing messages at runtime (i.e., optimized for runtime performance). The runtime representations can be used by one or more subcomponents of the runtime component 904 at runtime to process messages more efficiently. As a result, the runtime performance can be improved.

Figure 9B:
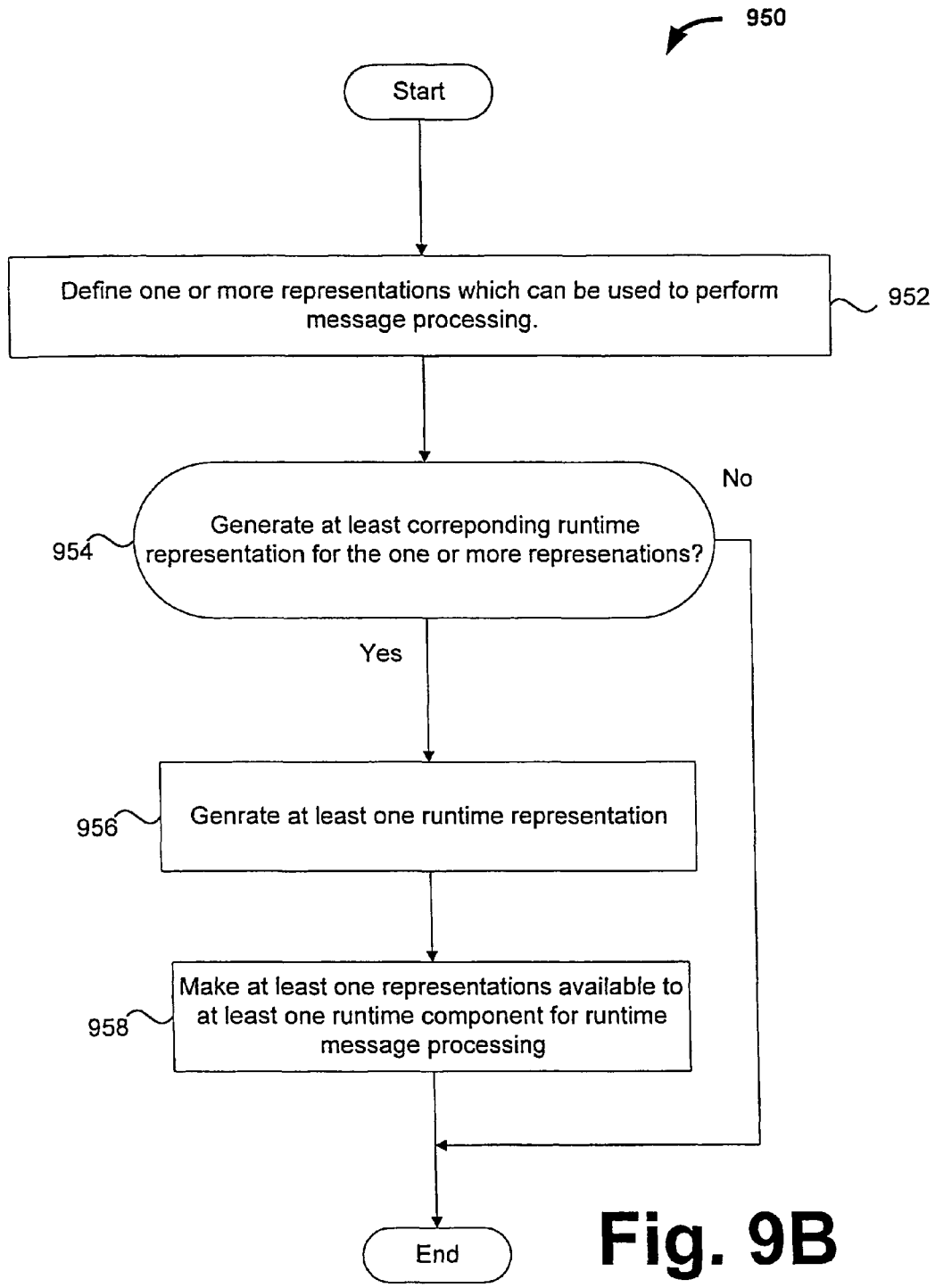
FIG. 9B illustrates a method for processing a message in accordance with one embodiment of the invention.

FIG. 9B illustrates a method 950 for processing a message in accordance with one embodiment of the invention. The method 950 can, for example, be used by the message server 900 of FIG. 9A. Initially, at operation 952, one or more data processing representations are defined. The data processing representations can, for example, be rules/policies, service request roles and service/operation definitions. The data representations can, for example, be defined based on a policy consideration associated with message processing. In any case, the data processing representations are typically used to perform message processing. As noted above, the one or more representations can be defined and/or maintained in a form which is well-suited for design time (e.g., before processing the message at runtime).

Next, at operation 954, a determination is made as to whether at least one corresponding runtime representation should be generated. The runtime representation is in a form which is more suitable for runtime processing. If it is determined at operation 954 that no runtime representations should be generated, the method 950 ends. However, if it is determined at operation 954 that the at least one runtime representation should be generated, the method 950 proceeds to operation 956 where at least one runtime representation is generated. Thereafter, at operation 958, at least one runtime representation is made available to at least one runtime component for processing at runtime. The method 950 ends following operation 958.

One embodiment of the invention is an XML Web Services (XWS) Message Server. XML Web Services are related to a set of evolving standards and common practices that are used to facilitate communication between computer programs. Examples of XML Web Services standards include: Extensible Markup Language (XML); XML Schema; SOAP; Web Services Description Language (WSDL); Extensible Stylesheet Language (XSL); XSL Transformations (XSLT); XPath; Universal Description, Discovery, and Integration (UDDI); Security Assertion Markup Language (SAML); XML Key Management Specification (XKMS); XML Signature; XML Encryption; and Web Services Security (WS-Security).

XML Web Services message traffic can, for example, include messages primarily formatted in Extensible Markup Language (XML) that travel from computer program to computer program in order to exchange information. As such, these messages can request one or more services or respond to requests for services, as will as initiating a procedure or providing the result of a procedure. An XML Web Services (XWS) Message Server can be implemented as a system of one or more software and/or hardware components that manage, secure, or coordinate XML Web Services message traffic.

Figure 10A:
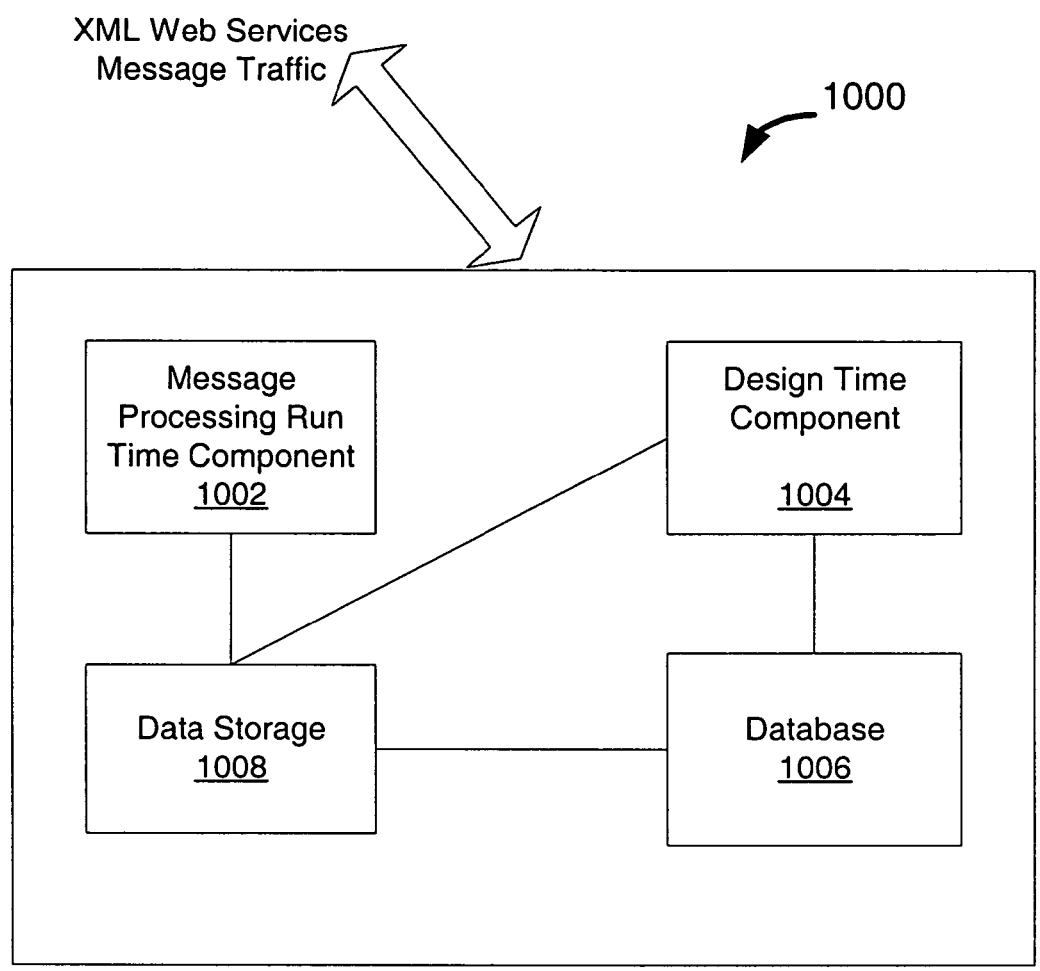
FIG. 10A illustrates an XWS Message Server in accordance with one embodiment of the invention.

FIG. 10A illustrates an XWS Message Server 1000 in accordance with embodiment of the invention. In the described embodiment, the XWS Message server 1000 includes a design time component 1002 and a message-processing runtime component (MPRT) 1004. As will be appreciated, the XWS Message Server 1000 can be used to generate both design time and runtime representations.

The design time representations can include, for example, rules, definitions, policies and other considerations useful in processing an XML message (e.g., role definitions, service requestor access control definitions, service and operation definitions/metadata that are used to processes a message, etc.). The design time representations are typically created before an XML message is processed. As such, the design representations can be stored in a database 1006 that provides structured persistent storage of data and flexible access to add, remove, modify, search and query the data. This allows the design time representations to be stored in a manner which best serves the need for frequent updating and retrieving data prior to processing the message at runtime.

On the other hand, the runtime representations can be created and stored in a form which is structured to improve message processing performance. As will be appreciated by those skilled in the art, several techniques can be used to improve message processing performance. These techniques, for example, include formatting to reduce the time required to create, load, reload, and/or transfer the data, aggregation of separate data, separation of aggregate data, pre-computation of higher-level data from more basic forms, pre-computation of which message transformation technique will perform optimally given the range of transformations that may be required at runtime, pre-computation of which data items from within the XML message may be required to process that message at runtime, normalization of data, and de-normalization of data. In any case, the runtime representations can, for example, be stored in storage device 1008.

Figure 10B:
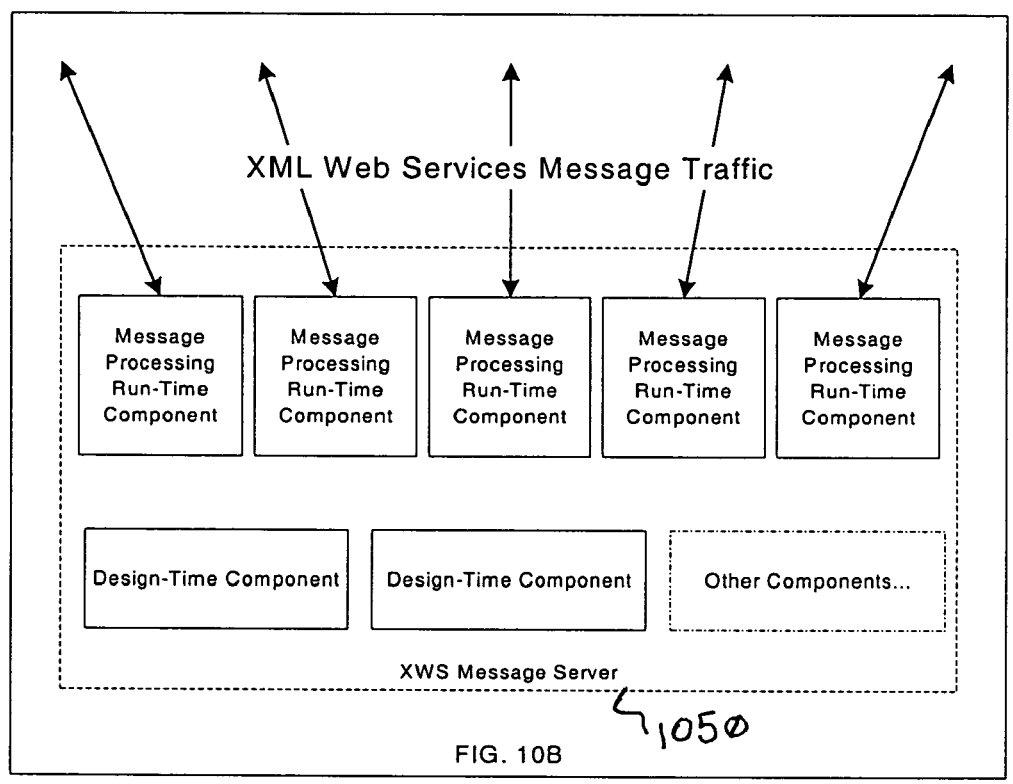
FIG. 10B illustrates an XWS Message Server in accordance with another embodiment of the invention.

FIG. 10B illustrates an XWS Message Server 1050 in accordance with another embodiment of the invention. As shown in FIG. 10B, the XWS Message Server 1050 includes a plurality of design time components and a plurality of runtime components. It should also be noted that the XWS Message Server 1050 can include one or more other components.

As will be appreciated, the XWS Message Server of FIG. 10A or FIG. 10B can reduce the latency associated with message processing in conventional distributed environments. This can be achieved by improving runtime performance. As a result, relatively smaller numbers of computing nodes are required to perform XML message processing. Thus, many problems associated with message processing in conventional distributed computing environments can be addressed. These problems include, for example, consolidation of updates between various computing nodes, scheduling of tasks, and hardware costs associated with managing various computer nodes operating in the distributed computing environment.

Accordingly, the XWS Message Server 1000 and 1050 respectively shown in FIG. 10A and FIG. 10B can improve XML message processing. One improvement relates to transformation of XML messages. During message processing, XML messages often need to be transformed. Such transformations may involve adding a message element, removing a message element, changing the name of an element, etc. Optimization can be achieved using one or more techniques. The techniques include, for example, using stream-oriented message parsing, message transformation, message building techniques, and use of stream-oriented data structures for representing messages within the XWS Message Server. The SAX parsing technology is an example of a stream-oriented XML parsing technique. These techniques can be utilized to reduce the need for creation of non-stream-oriented data structures in memory and reduce the need to operate on non-stream-oriented data structures when parsing, transforming or building XML messages. The DOM-tree data structure is an example of a non-stream-oriented data structure.

As will be appreciated, a design time and/or runtime component can recognize which classes of transformations can be performed using stream-oriented message handling techniques without the need to create a non-stream-oriented data structure. This information can be included in pre-computed data (e.g., data structures) used by the runtime component(s). Accordingly, the runtime component can use this information to minimize generation and use of non-stream-oriented data structures. By way of example, for message transformations that operate on individual message elements, filters can be implemented. Transformation can be done when a filter is triggered by the appearance of specified elements or patterns in the stream-oriented data structures. For example, XPATH can be used as a technique to specify the relevant message element or patterns of information relationships.

Figure 11:
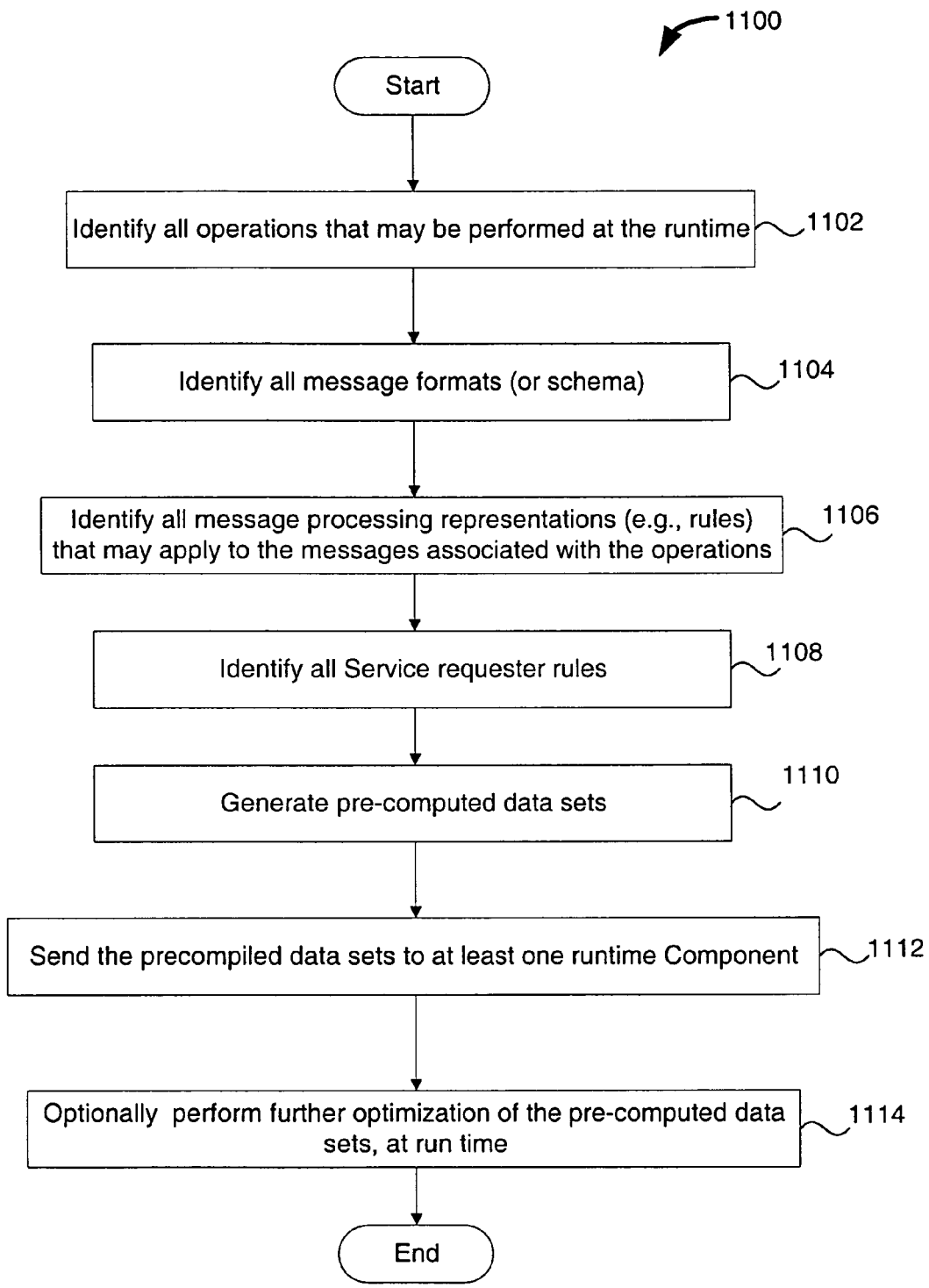
FIG. 11 illustrates a method for XML message processing in accordance with one embodiment of the invention.

FIG. 11 illustrates a method 1100 for XML message processing in accordance with one embodiment of the invention. The method 1100 can, for example, be used by the XWS Message Server 1000 of FIG. 10A. Initially, at operation 1102, all operations that may be used at runtime are identified. Next, at operation 1104, all message formats (or schema) are identified. Thereafter, at operation 1106, all message processing representations (e.g., rules) that may apply to the messages associated with the operations are identified. Finally, at operation 1108, all message processing representations associated with at least one service requestor (e.g., a client) are identified. Accordingly, at operation 1110, pre-computed datasets are generated based on one or more of the information identified in operations 1102, 1104, 1106 and 1108. Next, at operation 1112, the pre-computed data sets are sent to at least one runtime component. Finally, at operation 1114, the pre-computed data sets can optionally be further optimized at runtime.

Figure 12:
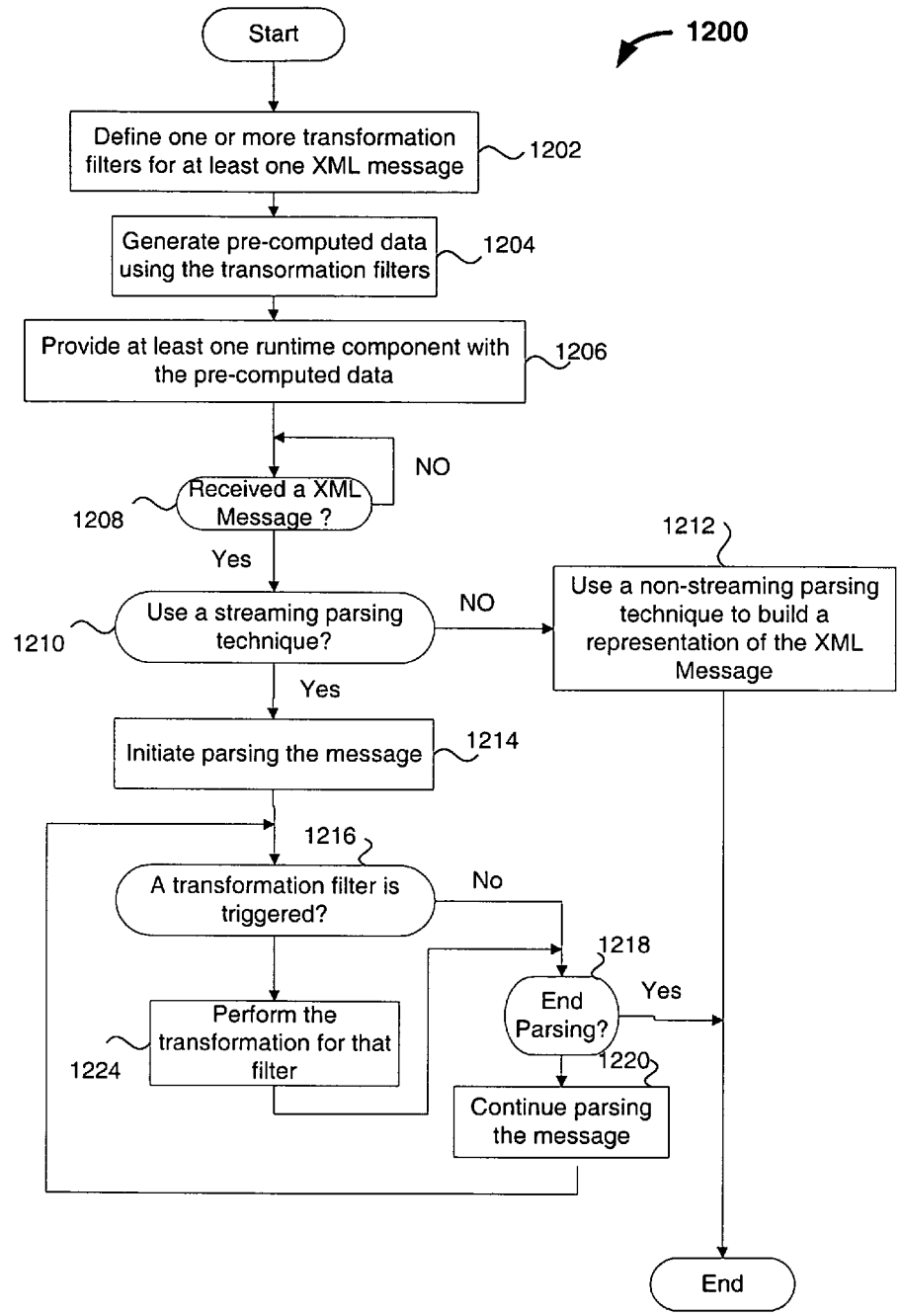
FIG. 12 illustrates a method for processing XML messages using pre-computed data sets in accordance with one embodiment of the invention.

As noted above, pre-computed datasets can be generated in accordance with one aspect of the invention. FIG. 12 illustrates a method for processing XML messages using pre-computed data sets in accordance with one embodiment of the invention. The method 1200, for example, can be performed by the XWS server 1000 of FIG. 10A. Initially, at operation 1202, one or more transformation filters are defined for at least one XML message. Next, at operation 1204, pre-computed data is generated using the transformation filters. Thereafter, at operation 1206, the pre-computed data is provided to at least one runtime component. It should be noted that operations 1202, 1204 and 1206 are typically performed before processing the message at runtime.

In any case, the method 1200 proceeds from operation 1206 to operation 1208 where a determination is made as to whether an XML message has been received. The determination made at operation 1208 can be performed at runtime. If it is determined at operation 1208 that an XML message has been received, the method 1200 proceeds to operation 1210 where it is determined if a streaming parsing technique should be used in order to parse the XML message sequentially as a stream. If it is determined at operation 1210 that a streaming parsing technique should not be used, the method 1200 proceeds to operation 1212 where a non-streaming parsing technique is used. As will be known to those skilled in the art, the non-streaming process can, for example, build a representation of the data (e.g., a DOM applying XSLT transformations). The method 1200 ends following operation 1212.

However, if it is determined at operation 1210 that a streaming parsing technique should be used, the method 1200 proceeds to operation 1214 where parsing of the XML message is initiated. This determination, for example, can be made based on the type of the XML message. Next, at operation 1216, it is determined whether a transformation filter is triggered. As will be appreciated, a pattern matching technique (e.g., XPATH) can be used to define filters.

If it is determined at operation 1216 that a transformation filter has not been triggered, the method 1200 proceeds to operation 1218 where it is determined whether parsing of the message has been completed. If it is determined at operation 1218 that the parsing of the message has been completed, the method 1200 ends. However, if it is determined at operation 1218 that the method 1200 should not end, the method 1200 proceeds to operation 1220 where parsing of the XML message is continued.

Thereafter, the method 1200 proceeds to operation 1216 where a determination is made as to whether a transformation filter has been triggered. If it is determined at operation 1216 that a transformation filter has been triggered, the method 1200 proceeds to operation 1224 where the transformation for the filter is performed. Next, the method 1200 proceeds to operation 1218 where it is determined if the method 1200 should end. Thereafter, the method 1200 proceeds in the same manner as described above. The method 1200 ends when it is determined at operation 1218 that the method 1200 should end or after completion of operation 1212.

As noted above, the XWS Message Server of FIG. 10A or FIG. 10B provide improved XML message processing. Another improvement relates to usage of message components when an XML message is processed. When an XML message is processed, often there is a need to retrieve one or more data components of an XML message. Optimization can be achieved using one or more techniques. These techniques include retrieving potentially needed data from the XML message through the use of stream-oriented message handling techniques.

Pre-computed data can be generated in advance to indicate which data items may be needed to process the message at runtime. This can minimize the number of times a message is scanned to retrieve data needed for processing.

Figure 13:
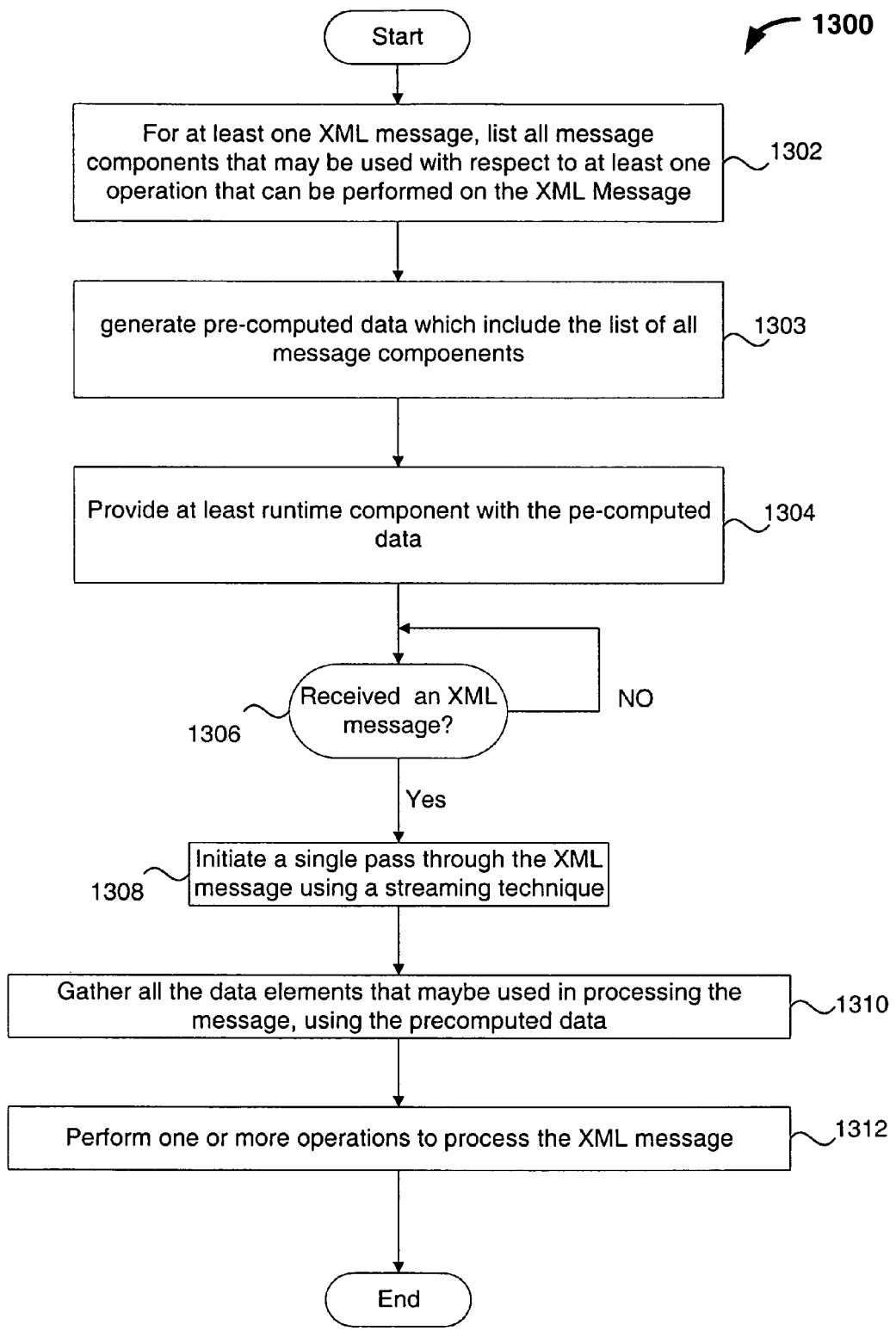
FIG. 13 illustrates a method for processing XML messages using pre-computed data sets in accordance with another embodiment of the invention.

FIG. 13 illustrates a method for processing XML messages using pre-computed data sets in accordance with another embodiment of the invention. Initially, at operation 1302, for at least one XML message, all of the message components which may be used in processing the message are listed. The listed XML message components can be listed with respect to at least one operation associated with processing of the XML message. Next, at operation 1303, pre-computed data which includes the list of all message components which can be used is generated. Thereafter, at operation 1304, at least one runtime component is provided with the pre-computed data. At operation 1306, a determination is made as to whether an XML message is received. It should be noted that operations 1302, 1303 and 1304 are typically performed before processing the message at runtime. However, the determination made at operation 1306 can be made at runtime during the processing of the message.

In any case, if it is determined at operation 1306 that an XML message is received, the method 1300 proceeds to operation 1308 where a single pass through the XML message is initiated using a streaming parsing technique. Next, at operation 1310, all data elements which may be needed to process the XML message are gathered using the pre-computed data. Finally, at operation 1312, one or more operations are performed to process the message. The method 1300 ends following operation 1312.

As will be appreciated, message processing representations can be represented as a sequence of instructions in accordance with one embodiment of the invention. As such, within a runtime component, message processing rules and policies are represented as a sequence of instructions. The instructions can be used, for example, to authenticate/authorize a sender, encrypt/decrypt a message, digitally sign a message or verify a digital signature. The instructions can be optimized using one or more techniques. These techniques include, for example, eliminating unnecessary or redundant instructions, delaying the execution of an instruction until its result is actually needed, reusing the results of expensive instructions or identify instructions that can be performed in parallel. Furthermore, execution of the instructions can be optimized using one or more techniques. These techniques include, for example, executing the instructions in a virtual machine implemented in hardware or software, caching instructions corresponding to frequently used messages, executing instructions in parallel, and making use of special-purpose hardware for cryptographic functions.

The many features and advantages of the present invention are apparent from the written description. Further, since numerous modifications and changes will readily occur to those skilled in the art, it is not desired to limit the invention to the exact construction and operation as illustrated and described. For example, several embodiments of the invention are described with reference to SOAP and XML interfaces. It will be understood, however, that the present invention includes other protocols and mechanisms by which the interaction of disparate nodes in a distributed computing environment may be facilitated.

The invention claimed is:

1. A system for processing messages between a plurality of nodes in a distributed computing environment, the system comprising a central processing unit and a computer-readable storage medium storing executable computer code, when executed the executable computer code causing the central processing unit to:

define a design time representation associated with processing of at least one message, wherein the at least one message is requesting services from a first node of the plurality of nodes and wherein each node in the plurality of nodes is capable of accessing services on a plurality of other nodes;

determine whether a runtime representation should be generated in order to enhance the runtime processing of the at least one message;

generate the runtime representation responsive to a determination that the runtime representation should be generated, the runtime representation configured to process the at least one message for the first node of the plurality of nodes; and process the at least one message using the design time representation and the runtime representation, wherein the processing of the at least one message includes transforming the at least one message for requesting services from the first node of the plurality of nodes into one or more new messages for requesting the services from one of (1) the first node of the plurality of nodes and additional one or more nodes of the plurality of nodes and (2) one or more nodes other than the first node of the plurality of nodes.

2. The system of claim 1, wherein said design time representation is defined based on at least one policy consideration for processing messages between a server node and a client node in said distributed computing environment.

3. The system of claim 1, wherein said design time representation is defined with respect to at least one operation which can be performed on said at least one message.

4. The system of claim 1, wherein said design time representation is stored in a database.

5. The system of claim 4, wherein said processing unit generates a user interface that is used to access said design time representation.

6. The system of claim 1, wherein said runtime representation is generated using one or more of the following techniques: formatting to reduce the time required to create, load, reload, and/or transfer data; aggregation of separate data; separation of aggregate data; pre-computation of higher-level data from more basic forms; pre-computation of which message transformation technique will perform optimally given the range of transformations that are required at runtime; pre-computation of which data items are required to process messages at runtime; normalization of data; and de-normalization of data.

7. The system of claim 1, wherein said runtime representation is represented as a sequence of instructions.

8. The system of claim 7, wherein, in order to optimize execution of instructions, one or more of the following techniques are used: eliminating unnecessary or redundant instructions, delaying execution of an instruction until its results is actually needed, reusing the results of expensive instructions, and identifying instructions that can be performed in parallel.

9. The system of claim 7, wherein, in order to optimize execution of instructions, one or more of the following techniques are used: executing instructions in a virtual machine stored on the computer-readable medium and implemented by the central processing unit; caching instructions corresponding to frequently used messages; executing instructions in parallel; and making use of special-purpose hardware for cryptographic functions.

10. The system of claim 1, wherein said design time representation is a rule, a policy, a service request role, a service definition, or an operation definition.

11. The system of claim 1, wherein said at least one message is an XML message.

12. A system for facilitating communication between a plurality of nodes in a distributed computing environment, each of the nodes in the plurality of nodes having a primary interface associated therewith, said system comprising a central processing unit which is operable to generate and publish a plurality of intermediate interfaces, each of which correspond to one of the primary interfaces, each of said intermediate interfaces being generated according to at least one policy:
 wherein the system comprises at least one design time component and at least one runtime component, and wherein each of said nodes in the plurality of nodes is capable of accessing services on the plurality of other nodes; and
 wherein said design time component is configured to:
  facilitate generation of or access to a first data representation associated with the at least one policy;
  determine whether a second data representation should be generated in order to enhance runtime processing of a message associated with the first data representation, wherein the message is requesting a service from a first node of the plurality of nodes;
  generate the second data representation responsive to a determination that the second data representation should be generated; and
  provide said at least one runtime component with said second data representation,
  wherein the processing of the message includes transforming said message for requesting a service from the first node of the plurality of nodes into a new message for requesting the service from one of (1) the first node of the plurality of nodes and additional one or more of the plurality of nodes and (2) one or more nodes of the plurality of nodes other than the first node of the plurality of nodes.

13. A system for facilitating communication between a client node and a plurality of server nodes in a distributed computing environment, each of said server nodes having a first interface associated therewith, said system comprising a central processing unit configured to:
 communicate with said plurality of server nodes via the plurality of first interfaces;
 generate and publish a second interface according to at least one policy; and
 communicate with said client node via said second interface, thereby allowing said client node to access services on said plurality of server nodes in accordance with said at least one policy;
 facilitate generation of or access to a first data representation associated with the at least one policy;
 determine whether a second data representation should be generated in order to enhance runtime processing of a message associated with the first data representation, wherein the message is requesting a service from a first node of the plurality of nodes;
 generate said second data representation responsive to a determination that said second data representation should be generated; and
 provide at least one of the plurality of first interfaces and the second interface with said second data representation,
 wherein the processing of the message includes transforming said message for requesting a service from the first node of the plurality of nodes into a new message for requesting the service from one of (1) the first node of the plurality of nodes and additional one or more of the plurality of nodes and (2) one or more nodes of the plurality of nodes other than the first node of the plurality of nodes.

14. A method of processing messages exchanged between a plurality of nodes in a distributed computing environment, the method comprising:
 defining a design time representation for processing a message, wherein said message is requesting a service from a first node of the plurality of nodes, wherein said design time representation is based on at least one policy consideration with respect to processing said message and wherein each node in the plurality of nodes is capable of exchanging messages with a plurality of other nodes;
 determining whether a runtime representation should be generated to enhance runtime processing of the message;
 generating the runtime representation responsive to a determination that said runtime representation should be generated; and
 processing said message at runtime using said runtime representation, wherein the processing of said message includes transforming said message for requesting a service from the first node of the plurality of nodes into a new message for requesting said service from one of (1) the first node of the plurality of nodes and additional one or more of the plurality of nodes and (2) one or more nodes of the plurality of nodes other than the first node of the plurality of nodes.

15. The method of claim 14, wherein said generating of said runtime representation comprises:
 identifying at least one operation to be performed at runtime;
 identifying at least one message format or schema to be used at runtime;
 identifying at least one message processing representation to apply to said at least one message format or said at least one operation; and
 identifying at least one service request or rule associated with said at least one message or said at least one operation.

16. A XML message system for processing XML messages between a plurality of nodes in a distributed computing environment, wherein said XML message system is configured to:
 define a first data representation associated with processing of at least one XML message, wherein the at least one XML message is requesting services from a first node of the plurality of nodes;
 allow each node in the plurality of nodes to exchange XML messages with a plurality of other nodes;

determine whether a second data representation should be generated in order to enhance the runtime processing of the at least one XML message;

generate the second data representation responsive to a determination that the second data representation should be generated; and process the at least one XML message at runtime using the second data representation, wherein the processing of the at least one XML message includes transforming the at least one XML message for requesting services from the first node of the plurality of nodes into one or more new XML messages for requesting the services from one of (1) the first node of the plurality of nodes and additional one or more of the plurality of nodes and (2) one or more nodes of the plurality of nodes other than the first node of the plurality of nodes.

17. The XML message system of claim 16, wherein said second representation is generated using one or more of the following techniques: formatting to reduce the time required to create, load, reload, and/or transfer data; aggregation of separate data; separation of aggregate data; pre-computation of higher-level data from more basic forms; pre-computation of which message transformation technique will perform optimally given the range of transformations that are required at runtime; pre-computation of which data items which are required to process XML messages at runtime; normalization of data; and de-normalization of data.

18. The XML message system of claim 16, wherein said first data representation is a rule, a policy, a service request role, a service definition, or an operation definition.

19. The XML message system of claim 16, wherein said first data representation is stored in a database.

20. The XML message system of claim 16, wherein said first data representation is defined with respect to at least one operation which can be performed on said at least one message.

21. The XML message system of claim 16, wherein said XML message server provides a user interface that is used to access said first representation.

22. The XML message system of claim 16, wherein said second data representation is represented as a sequence of instructions.

23. The XML message system of claim 22, wherein one or more of the following techniques are used: eliminating unnecessary or redundant instructions, delaying execution of an instruction until its result is actually needed, reusing the results of expensive instructions, and identifying instructions that can be performed in parallel, in order to optimize execution of said sequence of instructions.

24. The XML message system of claim 22, wherein one or more of the following techniques are used: executing instructions in a virtual that is stored on a computer-readable medium and implemented by a central processing unit; caching instructions corresponding to frequently used messages; executing instructions in parallel; and making use of special-purpose hardware for cryptographic functions, in order to optimize execution.

* * * * *